(12) United States Patent
Farmer et al.

(10) Patent No.: US 7,606,492 B2
(45) Date of Patent: Oct. 20, 2009

(54) SYSTEM AND METHOD FOR COMMUNICATING OPTICAL SIGNALS UPSTREAM AND DOWNSTREAM BETWEEN A DATA SERVICE PROVIDER AND SUBSCRIBERS

(75) Inventors: James O. Farmer, Lilburn, GA (US); Paul F. Whittlesey, Sugar Hill, GA (US); Patrick W. Quinn, Lafayette, CA (US); John J. Kenny, Norcross, GA (US); Emmanuel A. Vella, Alpharetta, GA (US); Thomas A. Tighe, Alpharetta, GA (US)

(73) Assignee: Enablence USA FTTX Networks Inc., Alpharetta, GA (US)

( * ) Notice: Subject to any disclaimer, the term of this patent is extended or adjusted under 35 U.S.C. 154(b) by 0 days.

(21) Appl. No.: 11/543,712

(22) Filed: Oct. 5, 2006

(65) Prior Publication Data
US 2007/0077069 A1    Apr. 5, 2007

Related U.S. Application Data

(63) Continuation of application No. 09/971,363, filed on Oct. 4, 2001, now Pat. No. 7,130,541.

(60) Provisional application No. 60/237,894, filed on Oct. 4, 2000, provisional application No. 60/244,052, filed on Oct. 26, 2000, provisional application No. 60/258,837, filed on Dec. 28, 2000, provisional application No. 60/243,978, filed on Oct. 27, 2000, provisional application No. 60/289,112, filed on May 8, 2001.

(51) Int. Cl.
*H04B 10/00* (2006.01)
(52) U.S. Cl. .................. 398/72; 398/66; 398/70
(58) Field of Classification Search .............. 398/66–75
See application file for complete search history.

(56) References Cited

U.S. PATENT DOCUMENTS 4,253,035 A    2/1981  Amitay (Continued)

FOREIGN PATENT DOCUMENTS

CA    2107922 A1    4/1995

(Continued)

OTHER PUBLICATIONS

"Trading Update and Operational Review Presentation" Marconi, Sep. 4, 2001, pp. 1-35.

(Continued)

*Primary Examiner*—Agustin Bello
(74) *Attorney, Agent, or Firm*—Sentry Law Group; Steven P. Wigmore

(57) ABSTRACT

An optical fiber network can include an outdoor bandwidth transforming node that can be positioned in close proximity to the subscribers of an optical fiber network. The outdoor bandwidth transforming node does not require active cooling and heating devices that control the temperature surrounding the bandwidth transforming node. The bandwidth transforming node can adjust a subscriber's bandwidth on a subscription basis or on an as-needed basis. The bandwidth transforming node can also offer data bandwidth to the subscriber in preassigned increments. Additionally, the bandwidth transforming node lends itself to efficient upgrading that can be performed entirely on the network side. The bandwidth transforming node can also provide high speed symmetrical data transmission. Further, the bandwidth transforming node can increase upstream and downstream bandwidth and transmission speed by propagating data signals at different wavelengths.

24 Claims, 18 Drawing Sheets

U.S. PATENT DOCUMENTS

| | | |
|---|---|---|
| 4,295,005 A | 10/1981 | Daugherty et al. |
| 4,495,545 A | 1/1985 | Dufresne et al. |
| 4,500,990 A | 2/1985 | Akashi |
| 4,654,891 A | 3/1987 | Smith |
| 4,665,517 A | 5/1987 | Widmer |
| 4,733,398 A | 3/1988 | Shibagaki et al. |
| 4,763,317 A | 8/1988 | Lehman et al. |
| 4,805,979 A | 2/1989 | Bossard et al. |
| 4,852,023 A | 7/1989 | Lee et al. |
| 4,891,694 A * | 1/1990 | Way .................. 725/114 |
| 4,945,541 A | 7/1990 | Nakayama |
| 4,956,863 A | 9/1990 | Goss |
| 4,975,899 A | 12/1990 | Faulkner |
| 5,105,336 A | 4/1992 | Jacoby et al. |
| 5,132,992 A | 7/1992 | Yurt et al. |
| 5,144,267 A | 9/1992 | West, Jr. |
| 5,179,591 A | 1/1993 | Hardy et al. |
| 5,189,725 A | 2/1993 | Bensel, III et al. |
| 5,247,347 A | 9/1993 | Litteral et al. |
| 5,249,194 A | 9/1993 | Sakanushi |
| 5,253,250 A | 10/1993 | Schlafer et al. |
| 5,253,275 A | 10/1993 | Yurt et al. |
| 5,303,295 A | 4/1994 | West et al. |
| 5,313,546 A | 5/1994 | Toffetti |
| 5,325,223 A | 6/1994 | Bears |
| 5,345,504 A | 9/1994 | West, Jr. |
| 5,349,457 A | 9/1994 | Bears |
| 5,365,585 A | 11/1994 | Puhl et al. |
| 5,365,588 A | 11/1994 | Bianco et al. |
| 5,378,174 A | 1/1995 | Brownlie et al. |
| 5,402,315 A | 3/1995 | Reichle |
| 5,412,498 A | 5/1995 | Arstein et al. |
| 5,432,875 A | 7/1995 | Korkowski et al. |
| 5,469,507 A | 11/1995 | Canetti et al. |
| 5,495,549 A | 2/1996 | Schneider et al. |
| 5,509,099 A | 4/1996 | Hermsen et al. |
| 5,510,921 A * | 4/1996 | Takai et al. .................. 398/79 |
| 5,528,455 A | 6/1996 | Miles |
| 5,528,582 A | 6/1996 | Bodeep et al. |
| 5,534,912 A | 7/1996 | Kostreski |
| 5,541,917 A | 7/1996 | Farris |
| 5,550,863 A | 8/1996 | Yurt et al. |
| 5,557,317 A | 9/1996 | Nishio et al. |
| 5,559,858 A | 9/1996 | Beveridge |
| 5,566,099 A | 10/1996 | Shimada |
| 5,572,347 A | 11/1996 | Burton et al. |
| 5,572,348 A | 11/1996 | Carlson et al. |
| 5,572,349 A | 11/1996 | Hale et al. |
| 5,610,744 A * | 3/1997 | Ho et al. ...................... 398/58 |
| 5,666,487 A | 9/1997 | Goodman et al. |
| 5,694,232 A | 12/1997 | Parsay et al. |
| 5,701,186 A | 12/1997 | Huber |
| 5,706,303 A | 1/1998 | Lawrence |
| 5,715,020 A | 2/1998 | Kuroiwa et al. |
| 5,731,546 A | 3/1998 | Miles et al. |
| RE35,774 E | 4/1998 | Moura et al. |
| 5,769,159 A | 6/1998 | Yun |
| 5,778,017 A | 7/1998 | Sato et al. |
| 5,790,523 A | 8/1998 | Ritchie, Jr. et al. |
| 5,793,413 A | 8/1998 | Hylton et al. |
| 5,793,506 A | 8/1998 | Schmid |
| 5,799,088 A | 8/1998 | Raike |
| 5,802,089 A | 9/1998 | Link |
| 5,822,102 A | 10/1998 | Bodeep et al. |
| 5,861,966 A | 1/1999 | Ortel |
| 5,867,485 A | 2/1999 | Chambers et al. |
| 5,875,430 A | 2/1999 | Koether |
| 5,880,864 A | 3/1999 | Williams et al. |
| 5,892,865 A | 4/1999 | Williams |
| 5,953,690 A | 9/1999 | Lemon et al. |
| 5,969,836 A | 10/1999 | Foltzer |
| 5,974,063 A | 10/1999 | Yoshida |
| 6,002,692 A | 12/1999 | Wills |
| 6,002,720 A | 12/1999 | Yurt et al. |
| 6,041,056 A | 3/2000 | Bigham et al. |
| 6,097,159 A | 8/2000 | Mogi et al. |
| 6,097,515 A | 8/2000 | Pomp et al. |
| 6,144,702 A | 11/2000 | Yurt et al. |
| 6,151,343 A | 11/2000 | Jurgensen |
| 6,167,553 A | 12/2000 | Dent |
| 6,198,558 B1 * | 3/2001 | Graves et al. ................ 398/135 |
| RE37,125 E | 4/2001 | Carlson et al. |
| 6,215,939 B1 | 4/2001 | Cloud |
| 6,229,701 B1 | 5/2001 | Kung et al. |
| 6,229,788 B1 * | 5/2001 | Graves et al. ................ 370/230 |
| 6,295,148 B1 | 9/2001 | Atlas |
| 6,300,562 B1 | 10/2001 | Daoud |
| 6,330,155 B1 | 12/2001 | Remsburg |
| 6,336,201 B1 | 1/2002 | Geile et al. |
| 6,342,004 B1 | 1/2002 | Lattimore et al. |
| 6,356,369 B1 | 3/2002 | Farhan |
| 6,360,320 B1 | 3/2002 | Ishiguro et al. |
| 6,362,908 B1 * | 3/2002 | Kimbrough et al. .......... 398/164 |
| 6,385,366 B1 | 5/2002 | Lin |
| 6,421,150 B2 | 7/2002 | Graves et al. |
| 6,424,656 B1 | 7/2002 | Hoebeke |
| 6,427,035 B1 | 7/2002 | Mahony |
| 6,452,714 B1 | 9/2002 | Rollins |
| 6,460,182 B1 | 10/2002 | BuAbbud |
| 6,463,068 B1 | 10/2002 | Lin et al. |
| 6,483,635 B1 | 11/2002 | Wach |
| 6,486,907 B1 | 11/2002 | Farber et al. |
| 6,490,727 B1 | 12/2002 | Nazarathy et al. |
| 6,493,335 B1 | 12/2002 | Darcie et al. |
| 6,496,641 B1 | 12/2002 | Mahony |
| 6,507,494 B1 | 1/2003 | Hutchison et al. |
| 6,529,301 B1 * | 3/2003 | Wang ........................... 398/82 |
| 6,546,014 B1 | 4/2003 | Kramer et al. |
| 6,577,414 B1 * | 6/2003 | Feldman et al. ................ 398/43 |
| 6,611,522 B1 | 8/2003 | Zheng et al. |
| 6,621,975 B2 | 9/2003 | Laporte et al. |
| 6,654,565 B2 | 11/2003 | Kenny |
| 6,674,967 B2 | 1/2004 | Skrobko et al. |
| 6,680,948 B1 | 1/2004 | Majd et al. |
| 6,682,010 B2 | 1/2004 | Pohl |
| 6,687,376 B1 | 2/2004 | Yamaguchi |
| 6,687,432 B2 | 2/2004 | Schemmann et al. |
| 6,707,024 B2 | 3/2004 | Miyamoto et al. |
| 6,738,983 B1 | 5/2004 | Rao et al. |
| 6,740,861 B2 | 5/2004 | Matsuda |
| 6,771,614 B1 | 8/2004 | Jones, IV et al. |
| 6,775,137 B2 | 8/2004 | Chu et al. |
| 6,778,785 B2 | 8/2004 | Imajo |
| 6,804,256 B2 | 10/2004 | Chang |
| 6,804,354 B1 | 10/2004 | Driscoll |
| 6,807,188 B1 | 10/2004 | Blahut et al. |
| 6,814,328 B1 | 11/2004 | Li et al. |
| 6,823,385 B2 | 11/2004 | McKinnon, III et al. |
| 6,889,007 B1 | 5/2005 | Wang et al. |
| 6,912,075 B1 | 6/2005 | Ionov et al. |
| 6,961,956 B2 | 11/2005 | Bontempi |
| 6,973,271 B2 | 12/2005 | Farmer et al. |
| 7,007,297 B1 | 2/2006 | Woodward |
| 7,023,871 B2 | 4/2006 | Lind et al. |
| 7,190,901 B2 | 3/2007 | Farmer et al. |
| 7,190,903 B1 * | 3/2007 | Combs et al. .................. 398/71 |
| 7,218,855 B2 | 5/2007 | Whittlesey et al. |
| 7,222,358 B2 | 5/2007 | Levinson et al. |
| 7,227,871 B2 | 6/2007 | Dworkin et al. |
| 7,242,694 B2 | 7/2007 | Beser |
| 7,272,321 B1 | 9/2007 | Kuo et al. |
| 7,283,749 B1 * | 10/2007 | Combs et al. .................. 398/72 |
| 7,386,236 B1 | 6/2008 | Kuo et al. |
| 2001/0002195 A1 | 5/2001 | Fellman et al. |

| | | | |
|---|---|---|---|
| 2001/0002196 A1 | 5/2001 | Fellman et al. | |
| 2001/0002486 A1 | 5/2001 | Kocher et al. | |
| 2001/0004362 A1 | 6/2001 | Kamiya | |
| 2001/0030785 A1 | 10/2001 | Pangrac et al. | |
| 2002/0006197 A1 | 1/2002 | Carroll et al. | |
| 2002/0012138 A1 | 1/2002 | Graves et al. | |
| 2002/0021465 A1 | 2/2002 | Moore, Jr. et al. | |
| 2002/0027928 A1 | 3/2002 | Fang | |
| 2002/0039218 A1 | 4/2002 | Farmer et al. | |
| 2002/0063924 A1 | 5/2002 | Kimbrough et al. | |
| 2002/0089725 A1 | 7/2002 | Farmer et al. | |
| 2002/0105965 A1 | 8/2002 | Dravida et al. | |
| 2002/0106178 A1 | 8/2002 | Bumgarner et al. | |
| 2002/0116719 A1 | 8/2002 | Dapper et al. | |
| 2002/0135843 A1 | 9/2002 | Gruia | |
| 2002/0141159 A1 | 10/2002 | Bloemen | |
| 2002/0164026 A1 | 11/2002 | Huima | |
| 2002/0181925 A1 | 12/2002 | Hodge et al. | |
| 2003/0007210 A1 | 1/2003 | Kenny | |
| 2003/0007220 A1 | 1/2003 | Whittlesey et al. | |
| 2003/0011849 A1 | 1/2003 | Farmer et al. | |
| 2003/0016692 A1 | 1/2003 | Thomas et al. | |
| 2003/0072059 A1 | 4/2003 | Thomas et al. | |
| 2003/0086140 A1 | 5/2003 | Thomas et al. | |
| 2003/0090320 A1 | 5/2003 | Skrobko et al. | |
| 2003/0128983 A1* | 7/2003 | BuAbbud et al. | 398/71 |
| 2003/0154282 A1 | 8/2003 | Horvitz | |
| 2003/0189587 A1 | 10/2003 | White et al. | |
| 2003/0194241 A1 | 10/2003 | Farmer | |
| 2003/0206564 A1 | 11/2003 | Mills et al. | |
| 2003/0206634 A1 | 11/2003 | Rose | |
| 2003/0223750 A1 | 12/2003 | Farmer et al. | |
| 2004/0052527 A1* | 3/2004 | Kirby | 398/57 |
| 2004/0086277 A1 | 5/2004 | Kenny | |
| 2004/0131357 A1 | 7/2004 | Farmer et al. | |
| 2004/0141747 A1 | 7/2004 | Kenny et al. | |
| 2004/0161217 A1 | 8/2004 | Hodge et al. | |
| 2004/0199502 A1 | 10/2004 | Wong et al. | |
| 2004/0221088 A1 | 11/2004 | Lisitsa et al. | |
| 2004/0253003 A1 | 12/2004 | Farmer et al. | |
| 2004/0264492 A1 | 12/2004 | Blahut | |
| 2004/0267730 A1 | 12/2004 | Dumais et al. | |
| 2005/0053350 A1 | 3/2005 | Hodge et al. | |
| 2005/0074241 A1 | 4/2005 | Farmer et al. | |
| 2005/0081244 A1 | 4/2005 | Barrett et al. | |
| 2005/0123001 A1 | 6/2005 | Craven et al. | |
| 2005/0125837 A1 | 6/2005 | Farmer et al. | |
| 2005/0175035 A1 | 8/2005 | Neely et al. | |
| 2006/0020975 A1 | 1/2006 | Kenny et al. | |
| 2006/0039699 A1 | 2/2006 | Farmer et al. | |
| 2006/0075428 A1 | 4/2006 | Farmer et al. | |
| 2006/0165413 A1* | 7/2006 | Schemmann et al. | 398/71 |
| 2007/0076717 A1 | 4/2007 | Limb et al. | |

FOREIGN PATENT DOCUMENTS

| | | |
|---|---|---|
| EP | 0713347 A2 | 5/1996 |
| EP | 0720322 A2 | 7/1996 |
| EP | 0 566 662 | 11/1999 |
| EP | 0955739 A2 | 11/1999 |
| EP | 0 933 892 | 10/2003 |
| JP | 7-20327 | 1/1995 |
| JP | 10-20123 | 1/1998 |
| JP | 11-305052 | 11/1999 |
| JP | 4-504433 | 3/2002 |
| MX | 180038 | 11/1995 |
| TW | 72821 | 8/1995 |
| WO | WO 01/27940 A2 | 4/2001 |
| WO | WO 02/30019 A3 | 4/2002 |
| WO | WO 02/30020 A2 | 4/2002 |
| WO | WO 02/060123 A2 | 8/2002 |
| WO | WO 03/001737 A3 | 1/2003 |
| WO | WO 03/005611 A2 | 1/2003 |
| WO | WO 03/005612 A1 | 1/2003 |
| WO | WO 03/019243 A2 | 3/2003 |
| WO | WO 03/021820 A1 | 3/2003 |
| WO | WO 03/023980 A2 | 3/2003 |
| WO | WO 03/079567 A1 | 9/2003 |
| WO | WO 03/090396 A2 | 10/2003 |
| WO | WO 2006/014433 A2 | 2/2006 |
| WO | WO 2006/020538 A2 | 2/2006 |
| WO | WO 2006/041784 A2 | 4/2006 |

OTHER PUBLICATIONS

"Cable Market" 2 pgs, Marconi Corporation, PLC, 2000 at www.Marconi.com.
"Communications" 2 pgs, Marconi Corporation, PLC, 2000 at www.Marconi.com.
"Dalton Utilities" 9 pgs, Marconi Corporation, PLC, 2002 at www.Marconi.com.
"Deep Fiber Solutions" 3 pgs, Marconi Corporation, PLC, 2000 at www.Marconi.com.
"Deep Fiber HFC Features and Benefits" 1 pg, Marconi Corporation, PLC, 2002 at www.Marconi.com.
"Deep Fiber HFC Network Diagram" 1 pg, Marconi Corporation, PLC, 2002 at www.Marconi.com.
"Deep Fiber HFC Product Overview: New FITL Configuration" 2 pgs, Marconi Corporation, PLC, 2002 at www.Marconi.com.
"Deep Fiber HFC Technical Specifications" 2 pgs, Marconi Corporation, PLC, 2002 at www.Marconi.com.
"Deep Fiber HFC—New FITL Configuration" 1 pg, Marconi Corporation, PLC, 2002 at www.Marconi.com.
"En-Touch" at 5 pgs, Marconi Corporation, PLC, 2002 www.Marconi.com.
"Deep Fiber HFC" Marconi Corporation PLC 2000, pp. 1-2.
"Integrated Voice, Video and Data Services Over a Single Fiber: A Compelling Opportunity for Cable Operators" Marconi Corporation PLC, May 2000, 6 pgs.
"Deep Fiber Solutions: Advanced Broadband Services" Marconi Corporation PLC, May 2000, 5pgs.
"Deep Fiber HFC: A Next-Generation Integrated Access Solution Offering Significant Improvement Over Traditional HFC Architectures" Marconi Corporation PLC, May 2000, 8pgs.
"A Gold Mine of Opportunities in the Face of Increasing Competition: Choices for Utilities Entering the Communications Marketplace" Marconi Corporation PLC, May 2000, 6pgs.
"Fiber Optics on New Development MDUs: A Research Summary," Marconi Corporation PLC, May 2000, 5pgs.
"Thermal Management Challenges: Small ONU Enclosures," Marconi Corporation PLC, May 2000, 9pgs.
"Passive Optical Networks—Is There Light at the End of the Access Tunnel?" CIBC World Markets Inc., Jan. 11, 2001, pp. 1-66.
"36.2.4 8B/10B transmission code", IEEE 2000, pp. 966-969.
G. Khoe et al., "Coherent Multicarrier Technology for Implementation in the Customer Access," IEEE, May/Jun. 1993, pp. 695-713.
L. Linnell, "A Wide-Band Local Access System Using Emerging-Technology Components," IEEE, Jul. 1986, pp. 612-618.
"Digital Broadband Delivery System: Out of Band Transport—Mode B," Society of Cable Telecommunications Engineers, Inc., Aug. 10, 1998, 76 pgs.
"Digital Broadband Delivery System: Out of Band Transport—Mode A," Society of Cable Telecommunications Engineers, Inc., Aug. 26, 1998, 49 pgs.
B. Gaglianello & P. Thompson, "An Efficient MAC Layer Protocol for EPON," IEEE 802.3 EFM Nov. 2001, 9 pgs.
"Cisco IOS™ Software Quality of Service Solutions," Cisco Systems, Inc. 1998, 28 pgs.
International Search Report for PCT/US01/21298, 2 pgs, mailed Jun. 17, 2002.
International Search Report for PCT/US02/03056, 1 pg, mailed Jun. 12, 2002.
"Ethernet—Accelerating the Standard for Speed," 7 pgs, Gigabit Ethernet Alliance, Nov. 2000 at www.gigabit-ethernet.org.

"eLuminant—Asynchronous Transfer Mode (ATM) Passive Optical Networks (PONS) Tutorial" 28 pgs, the International Engineering Consortium, 2000 at www.iec.org.

International Search Report dated Dec. 4, 2002 for PCT/US02/27398.

International Search Report dated Dec. 17, 2002 for PCT/US02/15861.

Global Access™, Universal Services Gateway, USG100, ARRIS, pp. 1-2, Oct. 18, 2002.

Global Access™, Universal Access Switch, UA4024, ARRIS, pp. 12, Aug. 28, 2002.

Partial International Search Report dated Jan. 3, 2003 for PCT/US01/31032.

International Search Report dated Apr. 22, 2003 for PCT/US01/50361.

L. Zhang et al., "Label-switching architecture for IP traffic over WDM networks", IEE Proc.-Commun., vol. 147, No. 5, Oct. 2000. pp. 269-275.

J. Masip-Torné, et al., "Providing Differentiated Service Categories in Optical Packet Networks", Proceedings of the International Teletraffic Congress 1999.

ITC-16. Teletraffic Engineering in a Competitive World. Edinburgh, UK, Jun. 7-11, 1999, Teletraffic Science and Engineering, Amsterdam: Elsevier, NL, vol. 3B, Jun. 7, 1999, pp. 1115-1126.

J. Bannister et al., "How Many Wavelengths Do We Really Need? A Study of the Performance Limits of Packet Over WaveLengths", Optical Networks Magazin. SPIE. Bellingham, WA, vol. 1, No. 2, Apr. 2000, pp. 17-28.

O. W.W. Yang, et al., "All-Optical WDM/TDM Star-Bus Network Using Optical Amplifiers", Journal of Optical Communications, Fachverlage Schiele & Schon, Berlin, DE, vol. 16, No. 6, Dec. 1, 1995, pp. 216-226.

Walter Ciciora et al., "Modern Cable Television Technology: Video, Voice, and Data Communications", © 1999 by Morgan Kaufman Publishers. Inc., pp. 167-176.

International Search Report dated Apr. 21, 2003 for PCT/US02/28734.

Written Opinion dated May 6, 2003 for PCT/US01/21298.

Bourne, John et al., "Heathrow—Experience and Evolution" IEEE, 1990, pp. 1091-1095.

Miki, Tetsuya et al., "A Design Concept on Fiber-Optic Wavelength-Division-Multiplexing Subscriber Loop System" WTG—Fachber, 1980, pp. 41-45.

Yamaguchi, K. et al., "A Broadband Access Network Based on Optical Signal Processing: The Photonic Highway" IEEE, 1990, pp. 1030-1037.

International Search Report of Jul. 7, 2003 for PCT/US01/51350.

Angelopoulos, J.D. et al., "A Transport Mac Method for Bandwidth Sharing and CDV Control at the ATM Layer of Passive Optical Networks" Journal of Lightwave Technology, IEEE, 1996, pp. 2625-2634.

International Search Report of Jul. 2, 2003 for PCT/US03/07814.

International Search Report of Oct. 3, 2003 for PCT/US03/12231.

Ciciora, Walter S. et al., "Modern Cable Television Technology: Video, Voice, and Data Communica-tions", © 1999, pp. 162-214, Chapter 4, Morgan Kaufmann Publishers, Inc., San Francisco, California.

Glaesemann, G. Scott et al., "The Mechanical Reliability of Corning® Optical Fiber in Bending White Paper", Sep. 2002, pp. 1-4.

Corning® SMF-28™ Optical Fiber Product Information, "Corning® Single-Mode Optical Fiber", Apr. 2002, pp. 1-4.

CEDaily Direct News, "Today's Report", Mar. 19, 2001, pp. 1-5.

Lucent Technologies, "Lucent Technologies Introduces Single-Fiber Network Access Devices for Voice, Video, and Data Services to the Home or Curb", Jun. 6, 2000, pp. 1-2.

Lucent Technologies, "Agere Systems Introduces Single-Fiber Network Access Devices for Voice, Video and Data Services to the Home or Curb", Mar. 19, 2001, pp. 1-3.

Optical Networks Daily, a Publication of Optical Keyhole, Aug. 26, 2003, pp. 1-13.

McDevitt et al., Switched vs Broadcast Video for Fiber-to-the Home Systems, Alcatel Network Systems, 1990, IEEE, CH2829-0/90/0000-1109, pp. 1109-1119.

Mangun et al., Fiber to the Home Experience in Southern Bell, BellSouth Services and Northern Telecom, 1988, IEEE, CH2536-1/88/0000-0208, pp. 208-212.

Han et al., Burst-Mode Penalty of AC- Coupled Optical Receivers Optimized for 8B/10B Line Code, 2004, IEEE.

Coppinger et al., Nonlinear Raman Cross-Talk in a Video Overlay Passive Optical Network, 2003, Tuesday Afternoon, OFC 2003, vol. 1, pp. 285-286.

Piehler et al., Nonlinear Raman Crosstalk in a 125-Mb/s CWDM Overlay on a 1310-nm Video Access Network, 2003, Optical Society of America.

Wong et al., 50-dB Nonlinear Crosstalk Suppression in a WDM Analog Fiber System by Complementary Modulation and Balanced Detection, 2003, IEEE, pp. 500-505.

Perkins, The Art of Overlaying Video Services on a BPON, 2004, Bechtel Corporation, pp. 1-9.

Digital Broadband Delivery System: Out of Band Transport—Mode B, *Society of Cable Telecommunications Engineers, Inc.*, pp. 1-49, Aug. 10, 1998.

eLuminant—Asynchronous Transfer Mode (ATM) Passive Optical Networks (PONS) Tutorial, *IEC Resources-International Engineering Consortium*, pp. 1-28, Jan. 1, 2000.

Spectral Grids for WDM Applications: CWDM Wavelength Grid, *International Telecommunications Union*, pp. i-iii and 1-4, Dec. 1, 2003.

PCT International Preliminary Exam Report—PCT/US03/12231, pp. 1-6, Sep. 17, 2004.

PCT International Preliminary Report—PCT/US03/07814, pp. 1-3, Nov. 19, 2003.

PCT International Search Report—PCT/US01/50361, pp. 1-3, Apr. 22, 2003.

PCT International Search Report—PCT/US01/51350, pp. 1-4, Jul. 7, 2003.

PCT International Search Report—PCT/US05/23847, pp. 1, Apr. 18, 2006.

PCT International Search Report—PCT/US05/28020, pp. 1, Nov. 8, 2006.

PCT International Search Report—PCT/US05/46419, pp. 1, Feb. 14, 2007.

PCT International Search Report—PCT/US06/11159, pp. 1, Feb. 21, 2007.

PCT International Search Report—PCT/US05/35512, pp. 1, Oct. 25, 2006.

Effenberger, G.983. Video Return Path, *International Telecommunications Union*, pp. 1-18, Oct. 1, 2004.

Fludger et al., Pump to Signal RIN Transfer in Raman Fiber Amplifiers, *Journal of Lightwave Technology*, vol. 19 (8), pp. 1140-1148, Aug. 1, 2001.

Gigabit Ethernet Alliance, Ethernet—Accelerating the Standard for Speed—10 GEA, www.gigabit-ethernet.org, pp. 1-7, Nov. 21, 2000.

Tian et al., Raman Crosstalk in Fiber-Optic Hybrid CATV Systems with Wide Channel Separations, *IEEE Photonics Technology Letters*, vol. 16 (1), pp. 344-346, Jan. 1, 2004.

* cited by examiner

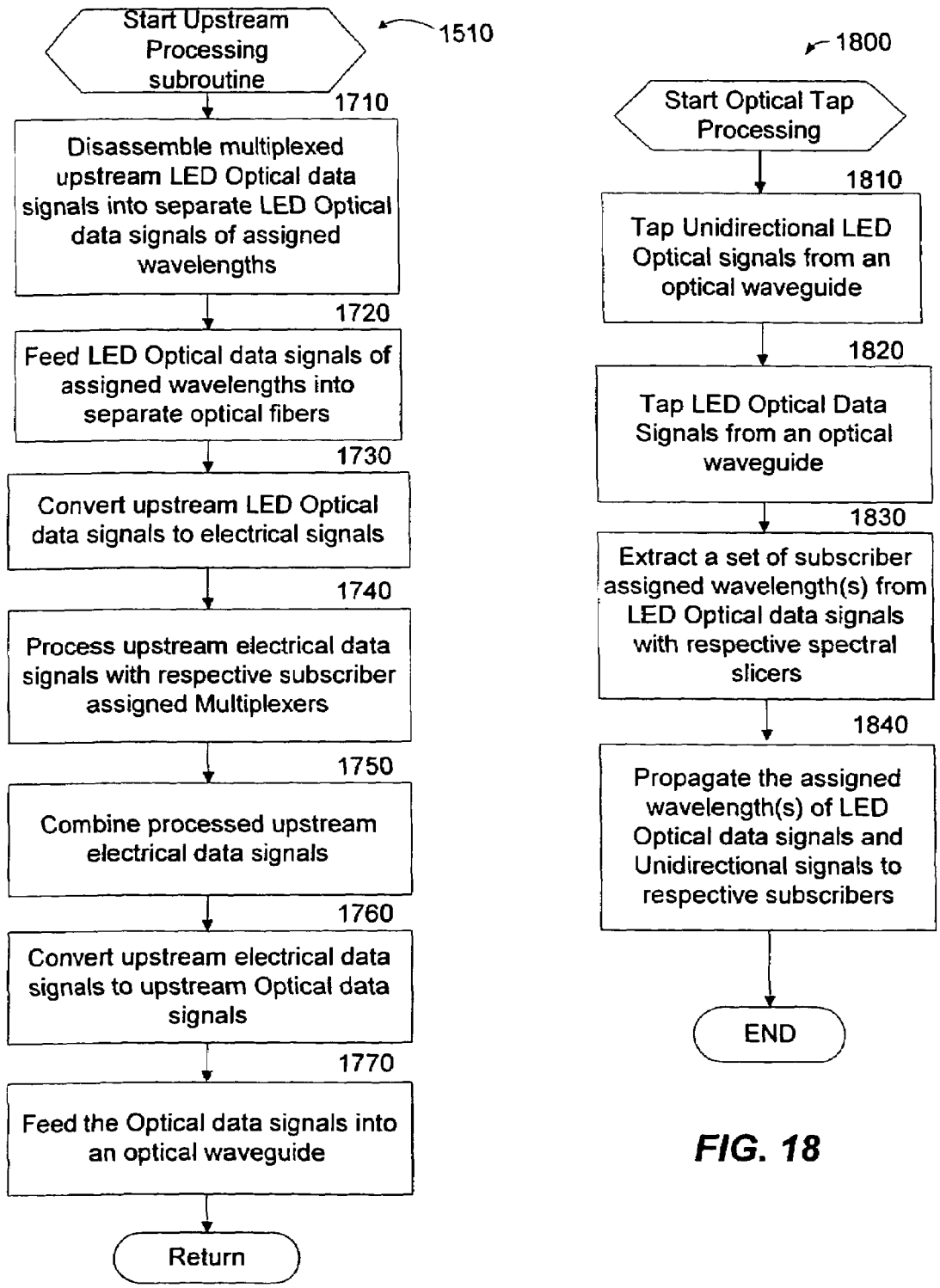

SYSTEM AND METHOD FOR COMMUNICATING OPTICAL SIGNALS UPSTREAM AND DOWNSTREAM BETWEEN A DATA SERVICE PROVIDER AND SUBSCRIBERS

STATEMENT REGARDING RELATED APPLICATIONS

The present application is a continuation of non-provisional patent application entitled, "System and Method for Communicating Optical Signals Between A Data Service Provider and Subscribers," filed on Oct. 4, 2001 and assigned U.S. application Ser. No. 09/971,363 now U.S. Pat. No. 7,130,541; and the present application claims priority to provisional patent application entitled, "Systems to Provide Video, Voice and Data Services via Fiber Optic Cable," filed on Oct. 4, 2000 and assigned U.S. Application Ser. No. 60/237,894; provisional patent application entitled, "Systems to Provide Video, Voice and Data services via Fiber Optic Cable—Part 2," filed on Oct. 26, 2000 and assigned U.S. Application Ser. No. 60/244,052; provisional patent application entitled, "Systems to Provide Video, Voice and Data services via Fiber Optic Cable—Part 3," filed on Dec. 28, 2000 and assigned U.S. Application Ser. No. 60/258,837; provisional patent application entitled, "Protocol to Provide Voice and Data Services via Fiber Optic Cable," filed on Oct. 27, 2000 and assigned U.S. Application Ser. No. 60/243,978; and provisional patent application entitled, "Protocol to Provide Voice and Data Services via Fiber Optic Cable—Part 2," filed on May 8, 2001 and assigned U.S. Application Ser. No. 60/289,112, the entire contents of which are incorporated by reference.

TECHNICAL FIELD

The present invention relates to video, voice, and data communications. More particularly, the present invention relates to a system and method for communicating optical signals between a data service provider and one or more subscribers.

BACKGROUND OF THE INVENTION

The increased use of and reliance on communication networks to transmit complex forms of data, such as voice and video data, has resulted in a demand in the marketplace for more bandwidth. Thus, conventional communication architectures that use coaxial cables are being replaced with communication networks that use only fiber optic cable, since optical fibers can carry a greater amount of data.

Data service providers have long desired Fiber-to-the-home (FTTH) and Fiber-to-the-business (FTTB) optical network architectures. These network architectures are known for their improved signal quality, for the lower system maintenance that they require, and for the longer life of the hardware that is employed in such systems. Though in the past the use of the FTTH and FTTB architectures was considered cost prohibitive, research and development has resulted in improved, cost-effective optical network alternatives.

The passive fiber optic network (PON) is an example of an FTTH architecture that is used in the industry. The PON architecture includes of an all-fiber network (where fiber optic transmission is used from the data service hub to subscribers' homes). In one configuration, optical splitters are used to divide the downstream signal among a plurality of homes, with one or more fiber optic cables connecting each home to the splitter. In another configuration, individual fibers extend from the data service hub directly to individual homes. Though the PON architecture allows for an all-fiber network, several drawbacks remain that make it impractical to implement.

First, in order to overcome the limitations that exist in the number of times an optical signal can be divided with an optical splitter before that signal becomes too weak to use, the PON architecture usually requires too many optical cables to originate at the data service hub. Second, because there is no active signal processing disposed between the data service hub and the subscriber, the maximum distance that can be achieved between the data service hub and a subscriber usually falls within the range of ten to twenty kilometers.

Third, another significant drawback of the PON architecture is the high cost of the equipment needed at the data service hub. For example, many PON architectures support the full service access network (FSAN), which uses the asynchronous transfer mode (ATM) protocol. Complex and expensive equipment is needed to support this protocol.

Fourth, not only is the PON architecture expensive, but it does not lend itself to efficient upgrades. Rather, in order to increase the data speed of the network, conventional and traditional PON architectures require fiber and router ports to be added during an actual physical reconfiguration of the network.

Finally, conventional PON architectures typically only support speeds up to 622 Megabits per second in the downstream direction and maximum speeds of 155 Megabits per second in the upstream direction. The term "downstream" can define a communication direction where a data service hub originates data signals that are sent downwards towards subscribers of an optical network. Conversely, the term "upstream" can define a communication direction where subscribers originate data signals that are sent upwards towards a data service hub of an optical network. Such unbalanced communication speeds between the upstream and downstream communication directions (referred to as asymmetrical bandwidth) is undesirable because it severely limits the amount of information that can be transferred from a subscriber to a data service hub.

As a result of the drawbacks of the PON architecture discussed above, a conventional hybrid FTTH/hybrid fiber-coax (HFC) architecture is commonly used by many cable television systems. In this FTTH/HFC architecture, an active signal source is placed between the data service hub and the subscriber. Typically, a router is used as the active signal source. The router has multiple data ports that are designed to support individual subscribers. More specifically, an optical fiber connects each data port of the router to each subscriber. The connectivity between data ports and optical subscribers yields a very fiber-intensive last mile. It is noted that the terms "last mile" and "first mile" are generic terms used to describe the last portion of an optical network that connects to subscribers.

In addition to the high number of optical cables originating from the router, the FTTH/HFC architecture requires that the optical signals be converted to electrical, radio frequency signals before they are propagated along traditional coaxial cables to the subscriber. Because radio frequency (RF) amplifiers are needed between the subscriber and the data service hub (RF amplifiers are typically needed every one to three kilometers in a coaxial-type system), this adds to the overall cost of the system. Additionally, because the FTTH/HFC architecture merely combines an optical network with an electrical network where both networks run independently of one another, high maintenance costs can result.

An additional drawback to the FTTH/HFC architecture is that the router requires a protected environment that occupies a significant amount of space. More specifically, it requires an environmentally controlled cabinet that must house the router and related equipment at an optimum temperature. In order to maintain this optimum temperature, the environmental cabinet typically includes active temperature control devices for heating and cooling the cabinet. These cooling and heating units consume power and are needed to maintain an operating temperature in all types of geographic areas and in all types of weather.

Although another conventional hybrid fiber coax (HFC) architecture exists that employs an active signal source between the data service hub and the subscriber that does not require a temperature-controlled environmental cabinet (as described above), this active signal source merely converts optical information signals to electrical information signals. More specifically, the active signal source in the HFC architecture converts downstream optical signals into electrical signals and upstream electrical signals into optical signals. Thus, because the conventional HFC architecture relies upon coaxial cable to transmit the electrical signals in the last mile of the HFC network, it still requires numerous RF amplifiers on the coaxial cable side of the network in order to ensure sufficient signal strength.

Additionally, the conventional HFC architecture also requires additional communication devices to support the data signals that propagate along the optical fibers between the active signal source and the data service hub. For example, because the conventional HFC architecture typically supports telephony service, it uses equipment known generically as host digital terminal (HDT). The HDT can include RF interfaces on the cable side and interfaces to either a telephone switch or to a cable carrying signals to a switch on the other side. Similarly, the data service hub of a conventional HFC architecture can further include a cable modem termination system (CMTS). The CMTS provides low level formatting and transmission functions for the data transmitted between the data service hub and the subscriber.

In addition to a CMTS, the conventional HFC architecture at the data service hub typically includes several modulators, or miniature television transmitters. Each modulator can convert video signals received from satellites to an assigned channel (frequency) for transmission to subscribers. Additionally, signal processors and other devices are used to collect the entire suite of television signals to be sent to subscribers. Typically, in a conventional HFC architecture, up to seventy-eight or more such modulators or processors will exist with their supporting equipment to serve the analog TV tier. Similar equipment will be used to serve the digital video tier.

Because HFC architecture uses CMTS, it cannot support symmetrical bandwidth. That is, the bandwidth of the conventional HFC architecture is typically asymmetrical because of the use of the data over cable service interface specification (DOCSIS). The nature of the DOCSIS standard is that it limits the upstream bandwidth available to subscribers. This can be a direct result of the limited upstream bandwidth available in an HFC plant. This is undesirable for subscribers who need to transmit more complex data for bandwidth intensive services such as home servers or the exchange of audio or video files over the Internet.

Another variation of the conventional HFC architecture exists in the marketplace where the CMTS can be part of the active signal source disposed between the data service hub and the subscriber. Though this variation of the conventional HFC architecture enables the active signal source to perform some processing, the output of the active signal source in this architecture is still radio frequency energy and is propagated along coaxial cables.

Accordingly, there is a need in the art for a system and method for communicating optical signals between a data service provider and a subscriber that eliminates the use of coaxial cables and the related hardware and software necessary to support the data signals propagating along the coaxial cables. There is also a need in the art for a system and method for communicating optical signals between a data service hub and a subscriber that supports high-speed symmetrical data transmission. In other words, there is a need in the art for an all-fiber optical network and method that can propagate the same bit rate downstream and upstream between a data service hub and a network subscriber. Further, there is also a need in the art for an optical network system and method that can service a larger number of subscribers while reducing the number of connections at the data service hub.

There is also a need in the art for an active signal source that can be disposed between a data service hub and a subscriber that can be designed to withstand outdoor environmental conditions and that can be designed to hang on a strand or fit in a pedestal similar to conventional cable TV equipment that is placed within a last mile of a communications network. A further need exists in the art for a system and method for receiving at least one gigabit or faster Ethernet communications in optical form from a data service hub and partition or apportion this optical bandwidth into distribution groups of a predetermined number. There is a further need in the art for a system and method that can allocate additional or reduced bandwidth based upon the demand of one or more subscribers on an optical network. Another need exists in the art for an optical network system that lends itself to efficient upgrading that can be performed entirely on the network side.

In other words, there is a need in the art for an optical network system that allows upgrades to hardware to take place in locations between and within a data service hub and an active signal source disposed between the data service hub and a subscriber. Another need exists in the art for an optical network that can increase information traffic carried by optical waveguides to and from subscribers of the optical network.

SUMMARY OF THE INVENTION

The present invention is generally drawn to a system and method for efficient propagation of data and broadcast signals over an optical fiber network. More specifically, the present invention is generally drawn to an optical network architecture that can include an outdoor bandwidth transforming or processing node that can be positioned in close proximity to the subscribers of an optical waveguide network. For example, the outdoor bandwidth transforming node can be designed to withstand outdoor environmental conditions and can be designed to hang on a strand or fit in a pedestal similar to conventional cable TV equipment that is placed within "the last mile" of an optical network architecture.

Unlike conventional electronic cable TV equipment or conventional optical bandwidth transforming nodes, the bandwidth transforming node can receive gigabit Ethernet communications in optical form from the data service hub and partition this optical bandwidth into distribution groups of a predetermined number. In one exemplary embodiment, the bandwidth transforming node can partition the optical bandwidth into distribution groups comprising at least six groups of at least sixteen subscribers. However, other partitioning sizes are not beyond the scope of the present invention.

Using an appropriate protocol in combination with a partitioning architecture, the bandwidth transforming node can allocate additional or reduced bandwidth based upon the demand of one or more subscribers. That is, the bandwidth transforming node can adjust a subscriber's bandwidth on a subscription basis or on an as needed basis. The bandwidth transforming node can offer data bandwidth to the subscriber in preassigned increments. For example, the bandwidth transforming node can offer a particular subscriber or groups of subscribers bandwidth in units of 1, 2, 5, 10, 20, 50, 100, and 450 Megabits per second (Mb/s).

In addition to offering bandwidth in preassigned increments, the bandwidth transforming node lends itself to efficient upgrading that can be performed entirely on the network side. In other words, upgrades to the hardware forming the bandwidth transforming node can take place in locations between and within the data service hub and the bandwidth transforming node. This means that the subscriber side of the network can be left entirely intact during an upgrade to the bandwidth transforming node or data service hub or both.

The bandwidth transforming node can also provide data symmetry at higher speeds. In other words, the bandwidth transforming node can propagate the same bit rates downstream and upstream between the data service hub and the network subscribers. Further, the bandwidth transforming node can also serve a larger number of subscribers while reducing the number of connections at the data service hub.

The flexibility and diversity of the bandwidth transforming node can be attributed to at least a few components. The bandwidth transforming node can comprise an optical tap routing device that is coupled to one or more optical tap multiplexers. The optical tap routing device can manage the interface with the data service hub data and can route or divide the data service hub data according to individual optical tap multiplexers that generate data for specific optical taps. The optical taps, in turn, service preassigned groups of subscribers.

The optical tap routing device can determine which optical tap multiplexer is to receive a downstream data signal, or identify which of the plurality of optical taps originated an upstream data signal. Each optical tap multiplexer can format data and implement the protocol required to send and receive data from each individual subscriber connected to a respective optical tap (as will be discussed below).

The bandwidth transforming node can further comprise one or more wavelength division multiplexers and demultiplexers. Each wavelength division multiplexer (WDM) can select one or more wavelengths of optical bandwidth originating from a respective optical tap multiplexer. Each WDM can then combine the one or more wavelengths of optical bandwidth together and feed them into a single optical waveguide. In this way, one optical waveguide can service a number of individual optical taps that can correspond to the number of optical tap multiplexers present in the bandwidth transforming node. The bandwidth transforming node can also support unidirectional optical signals originating from the data service hub. The unidirectional optical signals can comprise broadcast video or other similar RF signals.

The bandwidth transforming node is but one part of the present invention. The present invention also comprises an efficient coupler between the bandwidth transforming node and a respective subscriber, the efficient coupler being referred to as an optical tap. The optical tap can divide data signals between a plurality of subscribers and can be capable of managing optical signals of multiple wavelengths. The optical tap can also route signals to other optical taps that are downstream relative to a respective optical tap. The optical tap can also connect to a limited or small number of optical waveguides so that high concentrations of optical waveguides are not present at any particular optical tap.

Each optical tap can comprise one or more spectral slicers. Each spectral slicer can be complementary to a respective optical tap multiplexer present in a bandwidth transforming node. That is, each spectral slicer can filter or separate optical energy of a wavelength region that can comprise the wavelength region generated by a respective multiplexer in a bandwidth transforming node. In this way, upstream and downstream optical data signals can propagate simultaneously from optical taps to the data service hub without regard to when other optical signals are being propagated upstream from other optical taps that utilize the same optical waveguide. Each optical tap can also support downstream unidirectional optical signals, such as radio frequency (RF) signals, originating from the data service hub.

BRIEF DESCRIPTION OF THE DRAWINGS

FIG. 17 is a logic flow diagram illustrating an exemplary process for handling upstream data signals within an exemplary bandwidth transforming node of the present invention.

FIG. 18 is a logic flow diagram illustrating the processing of unidirectional and bi-directional data signals within an optical tap according to the present invention.

DETAILED DESCRIPTION OF EXEMPLARY EMBODIMENTS

The present invention may be embodied in hardware or software or a combination thereof disposed within an optical network. The present invention can comprise a bandwidth transforming node disposed between a data service hub and a subscriber that can allocate additional or reduced bandwidth based upon the demand of one or more subscribers. The present invention can support one gigabit or faster Ethernet communications in optical form to and from the data service hub and partition or apportion this optical bandwidth into distribution groups of a predetermined number. The present invention allows bandwidth to be offered to subscribers in pre-assigned increments. The flexibility and diversity of the present invention can be attributed to a few components.

The bandwidth transforming node of the present invention can comprise an optical tap routing device that is coupled to one or more tap multiplexers. The optical tap routing device can assign multiple subscribers to a single port that receives downstream optical signals from a data service hub. The bandwidth transforming node of the present invention can comprise off-the-shelf hardware to generate optical signals. For example, the LED optical transmitters of the present invention (as will be discussed below) can comprise one or more of the Volgatech SLD series diodes or the SLD-56-MP from Superlum, Ltd. The present invention can also comprise efficient couplers, such as optical taps, between the bandwidth transforming node and a respective subscriber optical interface.

The optical tap can divide optical signals among a plurality of subscribers and can be simple in its design. The optical tap can connect to a limited number of optical waveguides at a point remote from the bandwidth transforming node so that high concentrations of optical waveguides at the bandwidth transforming node can be avoided.

Figure 1:
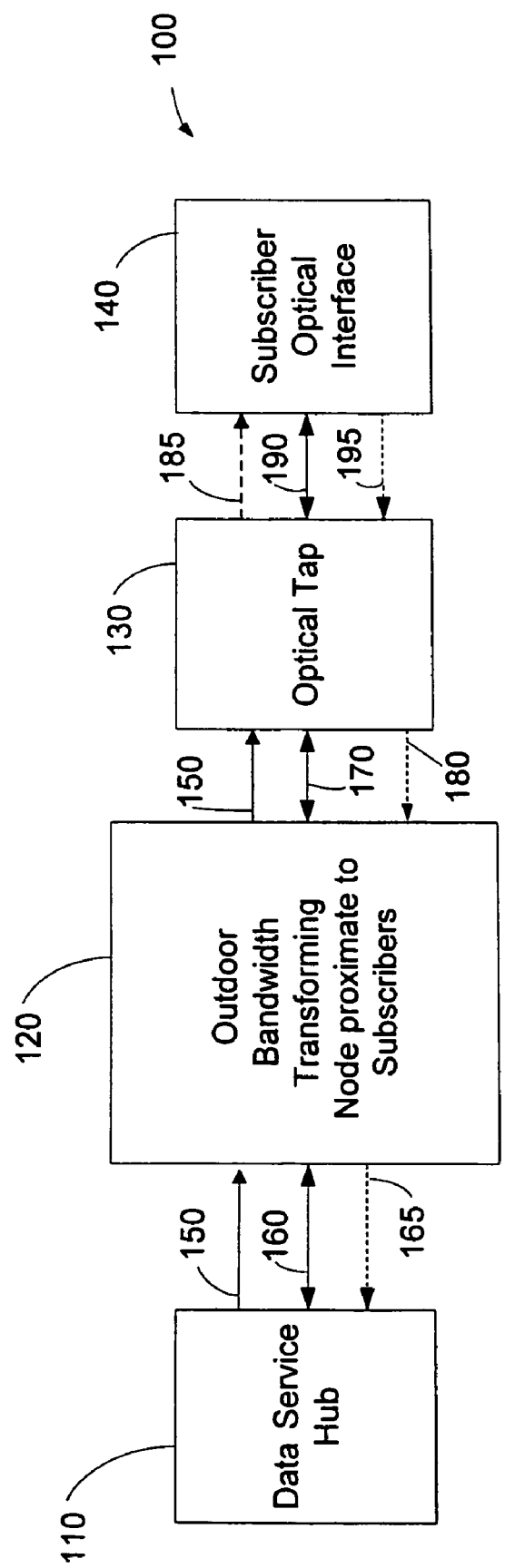
FIG. 1 is a functional block diagram of some core components of an exemplary optical network architecture according to the present invention.

Referring now to the drawings, in which like numerals represent like elements throughout the several Figures, aspects of the present invention and the illustrative operating environment will be described. FIG. 1 is a functional block diagram illustrating an exemplary optical network architecture 100 according to the present invention. The exemplary optical network architecture 100 comprises a data service hub 110 (also known by those skilled in the art as a "headend"), that is connected to outdoor bandwidth transforming nodes 120. The bandwidth transforming nodes 120, in turn, are connected to one or more optical taps 130. The optical taps 130 can be connected to a plurality of subscriber optical interfaces 140. Between respective components of the exemplary optical network architecture 100 are optical waveguides, such as optical waveguides 150, 160, 165, 170, 180, 185, 190, and 195. The optical waveguides 150-195 are illustrated by arrows where the arrowheads of the arrows illustrate exemplary directions of data flow between respective components of the illustrative and exemplary optical network architecture 100. While only an individual bandwidth transforming node 120, an individual optical tap 130, and an individual subscriber optical interface 140 are illustrated in FIG. 1, as will become apparent from FIG. 2 and its corresponding description, a plurality of bandwidth transforming nodes 120, optical taps 130, and subscriber optical interfaces 140 can be employed without departing from the scope and spirit of the present invention. Typically, in many of the exemplary embodiments of the present invention, multiple subscriber optical interfaces 140 are connected to one or more optical taps 130.

In one exemplary embodiment of the present invention, two optical waveguides 150 and 160 (that can comprise optical fibers) can propagate optical signals from the data service hub 110 to the outdoor bandwidth transforming node 120. It is noted that the term "optical waveguide" used in the present application can apply to optical fibers, planar light guide circuits, and fiber optic pigtails and other like optical waveguides.

A first optical waveguide 150 (also hereinafter referred to as a "broadcast waveguide") can carry broadcast video and other signals. The broadcast signals are carried as analog and digital modulated radio frequency carriers. The signals can be carried in a traditional cable television format, where the broadcast signals are modulated onto carriers, which in turn, modulate an optical transmitter (not shown in FIG. 1) in the data service hub 110. A second optical waveguide 160 (also hereinafter referred to as a "targeted services waveguide") can carry downstream targeted services (such as data and telephone services) as baseband digital signals to be delivered to one or more subscriber optical interfaces 140. In addition to carrying subscriber-specific optical signals, the targeted services waveguide 160 can propagate internet protocol broadcast packets, as is understood by those skilled in the art. Additionally, the targeted services waveguide 160 can transport data signals upstream from the bandwidth transforming node 120 to the data service hub 110. The optical signals propagated along the targeted services waveguide 160 can comprise data and telephone services received from one or more subscribers or IP broadcast packets, as is understood by those skilled in the art.

An upstream optical waveguide 165 is illustrated with dashed lines to indicate that it is merely an option or part of one exemplary embodiment according to the present invention. In other words, the upstream optical waveguide 165 can be removed. In one exemplary embodiment, an optical waveguide 160 propagates optical signals in both the upstream and downstream directions as is illustrated by the double arrows depicting that optical waveguide 160. In such an exemplary embodiment where the optical waveguide 160 propagates bi-directional optical signals, only two optical waveguides 150, 160 would be needed to support the optical signals propagating between the bandwidth transforming node 120 and the data service hub 110. In contrast, where the optical waveguide 160 propagates optical signals in only the downstream direction, the additional dashed optical waveguide 165 would be needed to propagate signals in the upstream direction between the bandwidth transforming node 120 and the data service hub 110.

Another upstream optical waveguide 180 is illustrated with dashed lines to indicate that it is merely an option or part of one exemplary embodiment according to the present invention. In other words, the dashed optical waveguide 180 can be removed. In another exemplary embodiment, an optical waveguide 170 propagates optical signals in both the upstream and downstream directions as is illustrated by the double arrows depicting that optical waveguide 170. In such an exemplary embodiment where the optical waveguide 170 propagates bi-directional optical signals, only two optical waveguides 150, 170 would be needed to support the optical signals propagating between the bandwidth transforming node 120 and the optical tap 130. In contrast, where the optical waveguide 170 propagates optical signals in only the downstream direction, the additional dashed optical waveguide 180 would be needed to propagate signals in the upstream direction between the bandwidth transforming node 120 and the optical tap 130.

Similarly, additional optical waveguides 185, 195 are illustrated with dashed lines to indicate that they are merely an option or part of another exemplary embodiment according to the present invention. In other words, the additional optical waveguides 185, 195 can be removed. In one exemplary embodiment, one optical waveguide 190 propagates optical signals in both the upstream and downstream directions as is illustrated by the double arrows depicting the optical waveguide 190. In such an exemplary embodiment where the optical waveguide 190 propagates bi-directional optical signals, only one optical waveguide 190 could support the optical signals propagating between the optical tap 130 and the subscriber optical interface 140.

In contrast, in another exemplary embodiment, where two waveguides are needed between the optical tap 130 and the subscriber optical interface 140, the optical waveguide 185 is used and propagates optical signals in the downstream direction, and optical waveguide 190 is used and propagates signals in both the downstream and the, upstream directions. Similarly, in another exemplary embodiment, where three waveguides are needed between the optical tap 130 and the subscriber optical interface 140, optical waveguide 185 is used to propagate signals in the downstream direction, optical waveguide 190 is used to propagate signals in the downstream direction, and optical waveguide 195 is used to propagate signals in the upstream direction. Last, in another exemplary embodiment, where two optical waveguides are required between optical tap 130 and subscriber optical interface 140, the signals from optical waveguide 185 and optical waveguide 190 are multiplexed together (not shown) and are propagated downstream on optical waveguide 190, and optical waveguide 195 is used to propagate signals in the upstream direction.

The outdoor bandwidth transforming node 120 can be designed to withstand outdoor environmental conditions and can be designed to hang on a strand or fit in a pedestal or "hand hole." The outdoor bandwidth transforming node 120 can operate in a temperature range between minus 40 degrees Celsius to plus 60 degrees Celsius. The bandwidth transforming node 120 can operate in this temperature range by using passive cooling devices that do not consume power.

Unlike conventional routers disposed between the subscriber optical interface 140 and the data service hub 110, the outdoor bandwidth transforming node 120 does not require active cooling and heating devices that control the temperature surrounding the bandwidth transforming node 120. The present invention attempts to place more of the decision-making electronics at the data service hub 110 instead of at the bandwidth transforming node 120. Typically, the decision-making electronics are larger in size and produce more heat than the electronics placed in the bandwidth transforming node 120 of the present invention. Because the bandwidth transforming node 120 does not require active temperature controlling devices, the bandwidth transforming node 120 lends itself to a compact electronic packaging volume that is typically smaller than the environmental enclosures of conventional routers. Further details of the components that make up the bandwidth transforming node 120 will be discussed in further detail below with respect to FIGS. 4, 5, 13, 15, 16, and 17.

In one exemplary embodiment, the optical tap 130 can comprise an 8-way optical splitter. This means that the optical tap 130 comprising an 8-way optical splitter can divide downstream optical signals eight ways to serve eight different subscriber optical interfaces 140. In the upstream direction, the optical tap 130 can combine the optical signals received from the eight subscriber optical interfaces 140.

In another exemplary embodiment, the optical tap 130 can comprise a 4-way splitter to service four subscriber optical interfaces 140. Yet in another exemplary embodiment, the optical tap 130 can further comprise a 4-way splitter that is also a pass-through tap. With a pass-through tap, a portion of the optical signal received at the optical tap 130 can be extracted to serve the 4-way splitter contained therein, while the remaining optical energy is propagated further downstream to another optical tap 130 or another subscriber optical interface 140. The present invention is not limited to 4-way and 8-way optical splitters. Other optical taps having fewer or more than 4-way or 8-way splitters are not beyond the scope of the present invention.

Figure 2:
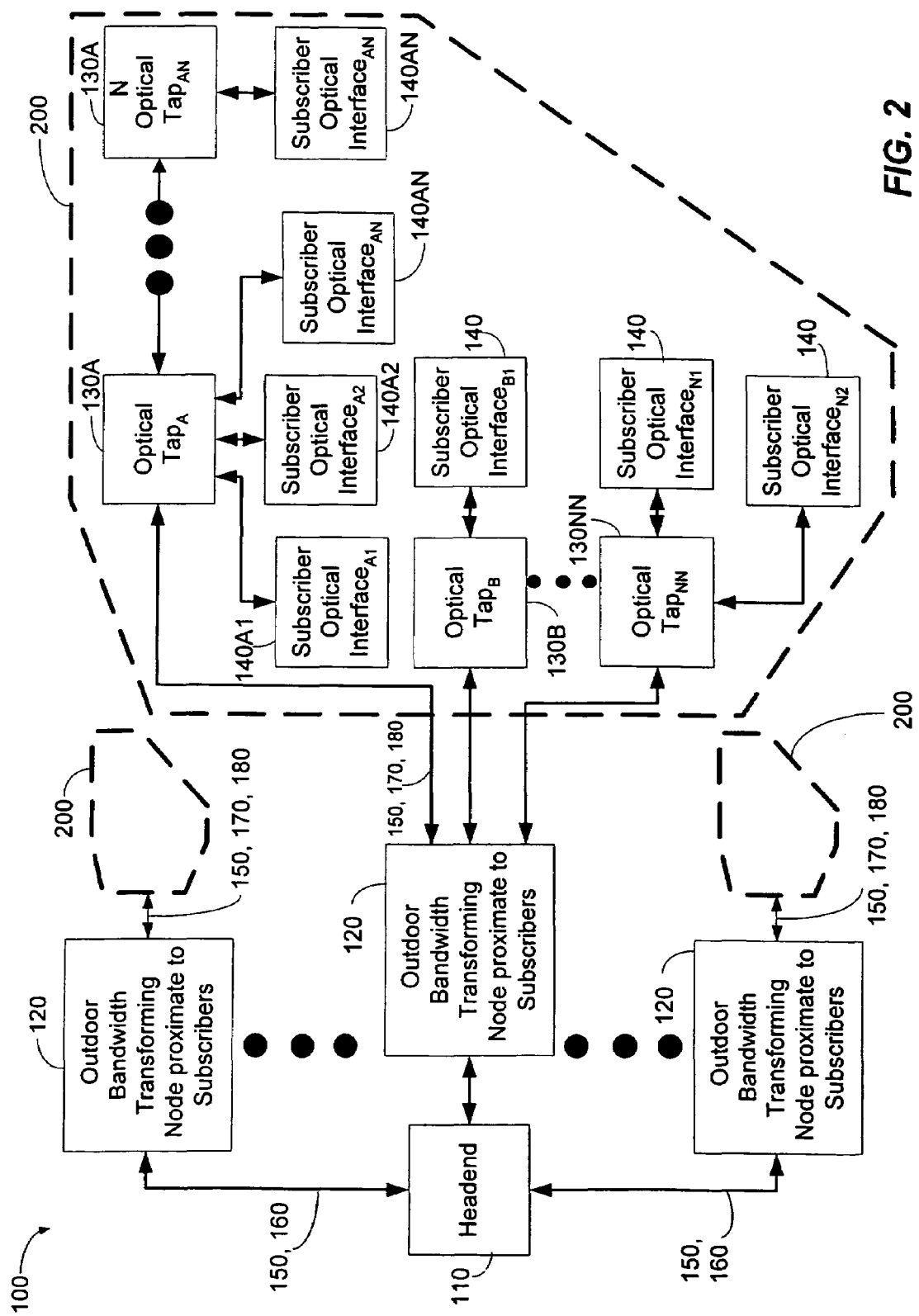
FIG. 2 is a functional block diagram illustrating an exemplary optical network architecture for the present invention.

Referring now to FIG. 2, this Figure is a functional block diagram illustrating an exemplary optical network architecture 100 that further includes subscriber groupings 200 that correspond with a respective outdoor bandwidth transforming node 120. FIG. 2 illustrates the diversity of the exemplary optical network architecture 100 where a number of optical waveguides 150, 170, 180 connected between the outdoor bandwidth transforming node 120 and the optical taps 130 is minimized. FIG. 2 also illustrates the diversity of subscriber groupings 200 that can be achieved with the optical tap 130.

Each optical tap 130 can comprise an optical splitter. The optical tap 130 allows multiple subscriber optical interfaces 140 to be coupled to optical waveguides 150, 170, 180 that are connected to the outdoor bandwidth transforming node 120. In one exemplary embodiment, six optical waveguides are designed to be connected to the outdoor bandwidth transforming node 120. Through the use of the optical taps 130, sixteen subscribers can be assigned to each of the six optical waveguides that are connected to the outdoor bandwidth transforming node 120.

In another exemplary embodiment, twelve optical waveguides can be connected to the outdoor bandwidth transforming node 120 while eight subscriber optical interfaces 140 are assigned to each of the twelve optical waveguides. Those skilled in the art will appreciate that the number of subscriber optical interfaces 140 assigned to particular waveguides 185, 190, 195 that are connected between the outdoor bandwidth transforming node 120 and a subscriber optical interface 140 (by way of the optical tap 130) can be varied or changed without departing from the scope and spirit of the present invention. Further, those skilled in the art recognize that the actual number of subscriber optical interfaces 140 assigned to the particular waveguide is dependent upon the amount of power available on a particular optical waveguide.

As depicted in subscriber grouping 200, many configurations for supplying communication services to subscribers are possible. For example, while optical tap $130_A$ can connect subscriber optical interfaces $140_{A1}$ through subscriber optical interface $140_{AN}$ to the outdoor bandwidth transforming node 120, optical tap $130_A$ can also connect other optical taps 130 such as optical tap $130_{AN}$ to the bandwidth transforming node 120. The combinations of optical taps 130 with other optical taps 130 in addition to combinations of optical taps 130 with subscriber optical interfaces 140 are limitless. With the optical taps 130, concentrations of distribution optical waveguides 150, 170, 180 at the bandwidth transforming node 120 can be reduced. Additionally, the total amount of fiber needed to service a subscriber grouping 200 can also be reduced.

With the active bandwidth transforming node 120 of the present invention, the distance between the bandwidth transforming node 120 and the data service hub 110 can comprise a range between 0 and 80 kilometers. However, the present invention is not limited to this range. Those skilled in the art will appreciate that this range can be expanded by selecting various off-the-shelf components that make up several of the devices of the present system.

Those skilled in the art will appreciate that other configurations of the optical waveguides disposed between the data service hub 110 and the outdoor bandwidth transforming node 120 are not beyond the scope of the present invention. Because of the bi-directional capability of optical waveguides, variations in the number and directional flow of the optical waveguides disposed between the data service hub 110 and the outdoor bandwidth transforming node 120 can be made without departing from the scope and spirit of the present invention.

Figure 3:
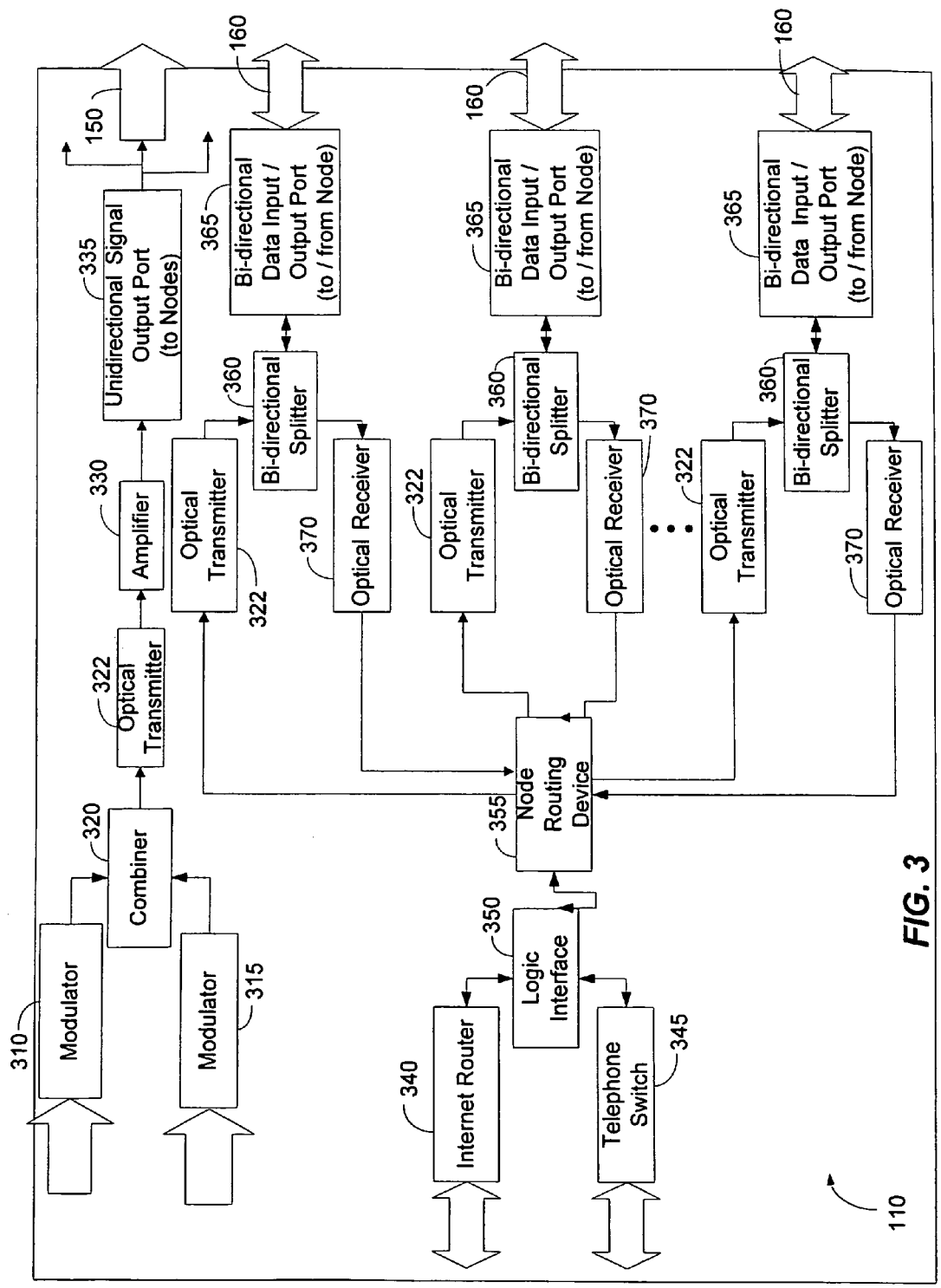
FIG. 3 is a functional block diagram illustrating an exemplary data service hub of the present invention.

Referring now to FIG. 3, this functional block diagram illustrates an exemplary data service hub 110 of the present invention. The exemplary data service hub 110 illustrated in FIG. 3 is designed for a two trunk optical waveguide system. That is, this data service hub 110 of FIG. 3 is designed to send and receive optical signals to and from the outdoor bandwidth transforming node 120 along the first optical waveguide 150 and a second optical waveguide 160, and possibly a third optical waveguide 165. With this exemplary embodiment, the second optical waveguide 160 supports bi-directional data flow.

The data service hub 110 can comprise one or more modulators 310, 315 that are designed to support television broadcast services. The one or more modulators 310, 315 can be analog or digital type modulators. In one exemplary embodiment, there can be at least 78 modulators present in the data service hub 110. Those skilled in the art will appreciate that the number of modulators 310, 315 can be varied without departing from the scope and spirit of the present invention.

The signals from the modulators 310, 315 are combined in a combiner 320 where they are supplied to an optical transmitter 322. The radio frequency signals generated by the modulators 310, 315 are converted into optical form in the optical transmitter 322.

The optical transmitter 322 can comprise standard off-the-shelf analog externally modulated distributed feed back (DFB) laser transmitters, including those manufactured by Synchronous and Arris. The laser optical transmitter 322 can also comprise one of Fabry-Perot (F-P) Laser Transmitters, and Vertical Cavity Surface Emitting Lasers (VCSELs). However, other types of optical transmitters are possible and are not beyond the scope of the present invention. With the aforementioned optical transmitters 322, the data service hub 110 lends itself to efficient upgrading by using off-the-shelf hardware to generate optical signals.

The one or more downstream optical signals generated by a laser optical transmitter 322 (referred to as the downstream unidirectional optical signals) are propagated to an amplifier 330, such as an Erbium Doped Fiber Amplifier (EDFA), where the downstream unidirectional optical signals are amplified. The amplified downstream unidirectional optical signals are then propagated out of the data service hub 110 via a unidirectional signal output port 335, which is connected to one or more first optical waveguides 150. The unidirectional signal output port 335 is connected to one or more first optical waveguides 150 that support unidirectional optical signals originating from the data service hub 110 to a respective bandwidth transforming node 120.

The data service hub 110 illustrated in FIG. 3 can further comprise an Internet router 340. The data service hub 110 can also comprise a telephone switch 345 that supports telephony service to the subscribers of the optical network system 100. However, other telephony services, such as Internet Protocol telephony, can be supported by the data service hub 110. If only Internet Protocol telephony is supported by the data service hub 110, then it is apparent to those skilled in the art that the telephone switch 345 could be eliminated in favor of lower cost VoIP equipment. For example, in another exemplary embodiment (not shown), the telephone switch 345 could be substituted with other telephone interface devices such as a soft switch and gateway. But if the telephone switch 345 is needed, it may be located remotely from the data service hub 110 and can be connected through any of several conventional means of interconnection.

The data service hub 110 can further comprise a logic interface 350 that is connected to a bandwidth transforming node routing device 355. The logic interface 350 can comprise a Voice over Internet Protocol (VoIP) gateway when required to support such a service. The bandwidth transforming node routing device 355 can comprise a conventional router that supports an interface protocol for communicating with one or more bandwidth transforming nodes 120. This interface protocol can comprise one of gigabit or faster Ethernet and SONET protocols. However, the present invention is not limited to these protocols. Other protocols can be used without departing from the scope and spirit of the present invention.

The logic interface 350 and bandwidth transforming node routing device 355 can read packet headers originating from the bandwidth transforming node 120 and the internet router 340. The logic interface 350 can also translate interfaces with the telephone switch 345. After reading the packet headers, the logic interface 350 and bandwidth transforming node routing device 355 can determine where to send the packets of information.

The bandwidth transforming node routing device 355 can supply downstream data signals to respective laser optical transmitters 322 as described above. The data signals converted by the laser optical transmitters 322 can then be propagated downstream to a bi-directional splitter 360. The downstream optical signals sent from the laser optical transmitter 322 into the bi-directional splitter 360 can then be propagated towards a bi-directional data input/output port 365 that is connected to a second optical waveguide 160 that supports bi-directional optical data signals between the data service hub 110 and a respective bandwidth transforming node 120.

Upstream optical signals received from a respective bandwidth transforming node 120 can be fed into the bi-directional data input/output port 365 where the optical signals are then forwarded to the bi-directional splitter 360. From the bi-directional splitter 360, respective optical receivers 370 can convert the upstream optical signals into the electrical domain. The upstream electrical signals generated by respective optical receivers 370 are then fed into the bandwidth transforming node routing device 355. Each optical receiver 370 can comprise one or more photoreceptors or photodiodes that convert optical signals into electrical signals.

When distances between the data service hub 110 and respective bandwidth transforming nodes 120 are modest, the laser optical transmitters 322 can propagate optical signals at 1310 nanometers. But where distances between the data service hub 110 and the bandwidth transforming node are more extreme, the optical transmitters 322 can propagate the optical signals at wavelengths of 1550 nanometers with or without appropriate amplification devices.

Those skilled in the art will appreciate that the selection of optical transmitters 322 for each circuit may be optimized for the optical path lengths needed between the data service hub 110 and the outdoor bandwidth transforming node 120. Further, those skilled in the art will appreciate that the wavelengths discussed are practical but are only illustrative in nature. In some scenarios, it may be possible to use communication windows at 1310 nanometers and 1550 nanometers in different ways without departing from the scope and spirit of the present invention. Further, the present invention is not limited to 1310 nanometer and 1550 nanometer wavelength regions. Those skilled in the art will appreciate that smaller or larger wavelengths for the optical signals are not beyond the scope and spirit of the present invention.

Figure 4:
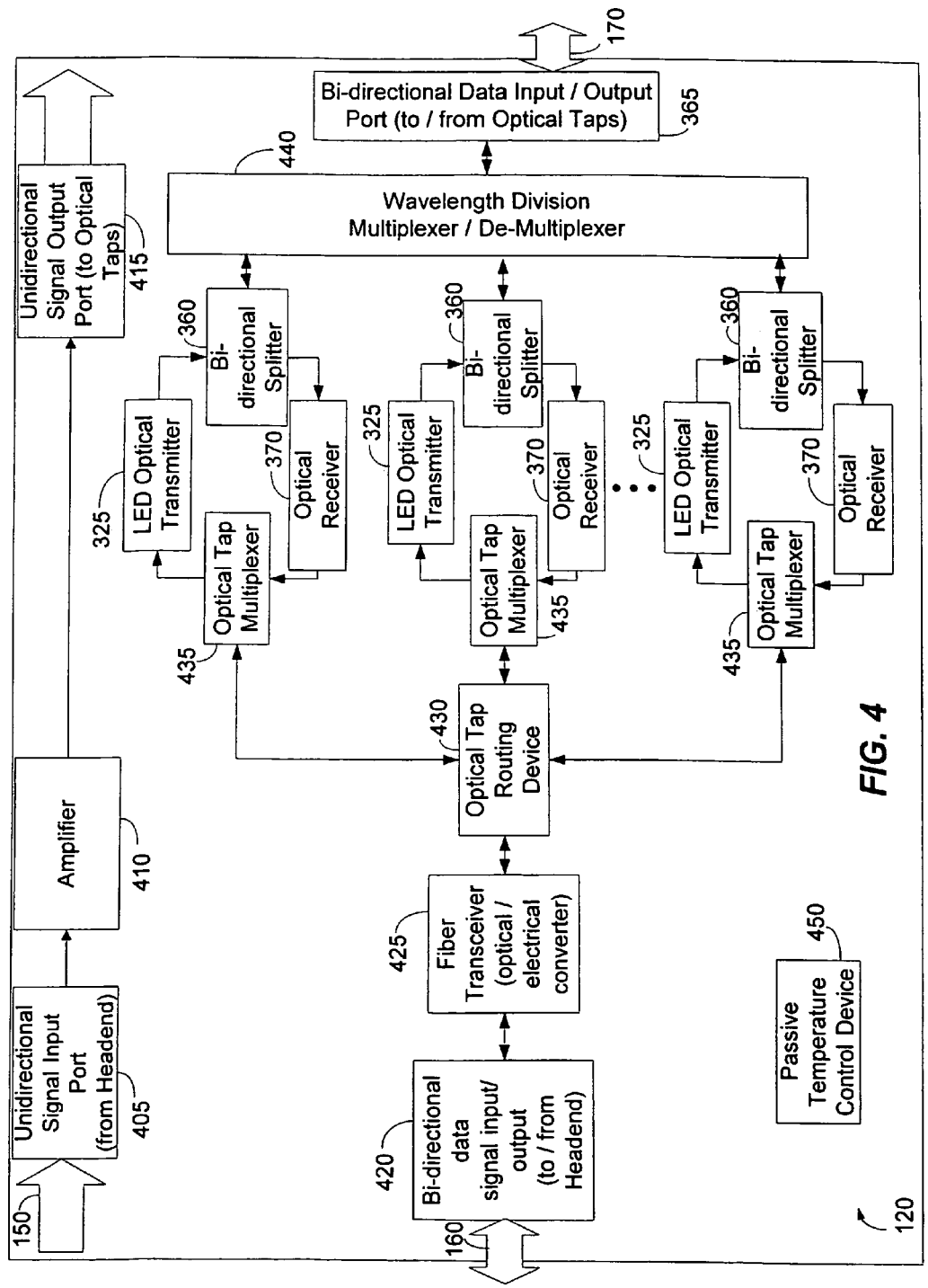
FIG. 4 is a functional block diagram illustrating an exemplary outdoor bandwidth transforming node according to the present invention.

Referring now to FIG. 4, this Figure illustrates a functional block diagram of an exemplary outdoor bandwidth transforming node 120 of the present invention. In this exemplary embodiment, the bandwidth transforming node 120 can comprise a unidirectional optical signal input port 405 that can receive optical signals propagated from the data service hub 110 that are propagated along a first optical waveguide 150. The optical signals received at the unidirectional optical signal input port 405 can comprise broadcast video data. The optical signals received at the input port 405 are propagated to an amplifier 410, such as an Erbium Doped Fiber Amplifier (EDFA), in which the optical signals are amplified. The amplified optical signals are then propagated to the unidirectional optical signal output port 415 and are then further propagated downstream.

The bandwidth transforming node 120 can further comprise a bi-directional optical signal input/output port 420 that connects the bandwidth transforming node 120 to a second optical waveguide 160 that supports bi-directional data flow between the data service hub 110 and the bandwidth transforming node 120. Downstream optical signals flow through the bi-directional optical signal input/output port 420 to a fiber transceiver 425, which can convert downstream optical signals into the electrical domain. The fiber transceiver 425 can further convert upstream electrical signals into the optical domain. The fiber transceiver 425 can comprise an optical/electrical converter and an electrical/optical converter.

Downstream and upstream electrical signals are communicated between the fiber transceiver 425 and an optical tap routing device 430. The optical tap routing device 430 can manage the interface with the data service hub optical signals and can route or divide or apportion the data service hub signals according to which optical tap 130 is to receive the downstream signal or according to which optical tap 130 originated the upstream signal. More specifically, for downstream signals, the optical tap routing device 430 can manage the interface with the data service hub optical signals and can route these signals to the corresponding individual optical tap multiplexers 435 that communicate optical signals with particular optical taps 130 and ultimately one or more subscriber optical interfaces 140. It is noted that tap multiplexers 435 operate in the electrical domain to modulate LED transmitters in order to generate optical signals that are assigned to groups of subscribers coupled to one or more optical taps 130.

Similarly, the optical tap routing device 430 is notified of available upstream data packets as they arrive by each tap multiplexer 435. The optical tap routing device 430 is connected to each tap multiplexer 435 to receive these upstream data packets. The optical tap routing device 430 relays the packets to the data service hub 110 via the fiber transceiver 425. The optical tap routing device 430 can build a lookup table from these upstream data packets coming to it from all tap multiplexers 435 (or ports), by reading the source IP address of each packet, and associating it with the tap multiplexer 435 through which it came. This lookup table can then be used to route packets in the downstream path As each packet comes in from the fiber transceiver 425, the optical tap routing device 430 looks at the destination IP address (which is the same as the source IP address for the upstream packets). From the lookup table the optical tap routing device 430 can determine which port is connected to that IP address, so it sends the packet to that port. This can be described as a normal layer three router function as is understood by those skilled in the art.

The optical tap routing device 430 can assign multiple subscribers to a single port. More specifically, the optical tap routing device 430 can service groups of subscribers with corresponding respective, single ports. The optical taps 130 coupled to respective tap multiplexers 435 can supply downstream optical signals to pre-assigned groups of subscribers who receive the downstream optical signals with the subscriber optical interfaces 140.

In other words, the optical tap routing device 430 can determine which tap multiplexers 435 are to receive a downstream electrical signal, or identify which of a plurality of optical taps 130 propagated an upstream optical signal (that is converted to an electrical signal). The optical tap routing device 430 can format data and implement the protocol required to send and receive data from each individual subscriber connected to a respective optical tap 130. The optical tap routing device 430 can comprise a computer or a hardwired apparatus that executes a program defining a protocol for communications with groups of subscribers assigned to individual ports. One exemplary embodiment of the program defining the protocol is discussed in copending and commonly assigned provisional patent application entitled, "Protocol to Provide Voice and Data Services via Fiber Optic Cable," filed on Oct. 27, 2000 and assigned U.S. Application Ser. No. 60/243,978, the entire contents of which are incorporated by reference. Another exemplary embodiment of the program defining the protocol is discussed in copending and commonly assigned provisional patent application entitled, "Protocol to Provide Voice and Data Services via Fiber Optic Cable—Part 2," filed on May 8, 2001 and assigned U.S. Application Ser. No. 60/289,112, the entire contents of which are incorporated by reference.

The single ports of the optical tap routing device 430 are connected to respective tap multiplexers 435. With the optical tap routing device 430, the bandwidth transforming node 120 can adjust a subscriber's bandwidth on a subscription basis or on an as needed or demand basis. The bandwidth transforming node 120 via the optical tap routing device 430 can offer data bandwidth to subscribers in pre-assigned increments. For example, the bandwidth transforming node 120 via the optical tap routing device 430 can offer a particular subscriber or groups of subscribers bandwidth in units of 1, 2, 5, 10, 20, 50, 100, 200, and 450 Megabits per second (Mb/s). Those skilled in the art will appreciate that other subscriber bandwidth units are not beyond the scope of the present invention.

Electrical signals are communicated between the optical tap routing device 430 and respective tap multiplexers 435. The tap multiplexers 435, along with LED optical transmitters 325 and optical receivers 370, propagate optical signals to and from various groupings of subscribers. Each tap multiplexer 435 is connected to a respective light emitting diode (LED) optical transmitter 325. The LED optical transmitters 325 produce the downstream optical signals that are propagated towards the subscriber optical interfaces 140. As noted above, the LED optical transmitters 325 can comprise one or more of the Volgatech SLD series diodes or the SLD-56-MP from Superlum, Ltd.

Each tap multiplexer 435 is also coupled to an optical receiver 370. Each optical receiver 370, as noted above, can comprise photoreceptors or photodiodes. Since the optical transmitters 325 can comprise low cost, off-the-shelf LEDs rather than lasers, and the and optical receivers 370 can comprise off-the-shelf photoreceptors or photodiodes, the bandwidth transforming node 120 lends itself to efficient upgrading and maintenance to provide significantly increased data rates.

Each LED optical transmitter 325 and each optical receiver 370 can be connected to a respective bi-directional splitter 360. Each bi-directional splitter 360 in turn can be connected to a wavelength division multiplexer/de-multiplexer 440.

The signals propagating from each LED optical transmitter 325 or propagating to each optical receiver 370 are combined in the bi-directional splitter 360. The optical signals sent from the optical transmitter 325 into the bi-directional splitter 360 can then be propagated to the wavelength division multiplexer 440 and then towards a bi-directional input/output port 365 that is connected to another optical waveguide 170 that supports bi-directional optical data signals between the bandwidth transforming node 120 and a respective optical tap 130.

Once the downstream signals propagate from the bi-directional splitter 360 to the wavelength division multiplexer 440, the wavelength division multiplexer 440 can select and combine or multiplex the wavelengths of light that propagate from each LED optical transmitter 325. For example, an optical signal passed through a wavelength division multiplexer 440 from a first optical transmitter 325 may be tuned at optical wavelength $\lambda_a$, while the signal passed through a wavelength division multiplexer 440 from a second transmitter 325 may be tuned at optical wavelength $\lambda_b$. The signal passed through a wavelength division multiplexer 440 from a third transmitter 325 may be tuned at optical wavelength $\lambda_c$, and the signal passed through wavelength division multiplexer 440 from an $n^{th}$ transmitter 325 may be tuned at optical wavelength $\lambda_n$. The corresponding receivers 370 operate at the same respective wavelengths.

By propagating information at different wavelengths, one optical waveguide can service a number of individual optical taps 130 that are connected to a like number of optical tap multiplexers 435. Moreover, as recognized by those skilled in the art, optical power is proportional to the width of each wavelength band. Thus, when more optical power is needed (for example, to service an optical tap 130 located a long distance away from the bandwidth transforming node 120) larger wavelength bands can be used.

Unlike the conventional art, the bandwidth transforming node 120 does not employ a conventional router. The components of the bandwidth transforming node 120 can be disposed within a compact electronic packaging volume. For example, the bandwidth transforming node 120 can be designed to hang on a strand or fit in a pedestal similar to conventional cable TV equipment that is placed within the "last mile" or subscriber proximate portions of a network. It is noted that the term "last mile" is a generic term often used to describe the last portion of an optical network that connects to subscribers.

Also because the optical tap routing device 430 is not a conventional router, it does not require active temperature controlling devices to maintain the operating environment at a specific temperature. In other words, the bandwidth transforming node 120 can operate in a temperature range between minus 40 degrees Celsius to 60 degrees Celsius in one exemplary embodiment.

While the bandwidth transforming node 120 does not comprise active temperature controlling devices that consume power to maintain temperature of the bandwidth transforming node 120 at a single temperature, the bandwidth transforming node 120 can comprise one or more passive temperature controlling devices 450 that do not consume power. The passive temperature controlling devices 450 can comprise one or more heat sinks or heat pipes that remove heat from the bandwidth transforming node 120. Those skilled in the art will appreciate that the present invention is not limited to these exemplary passive temperature controlling devices listed. Further, those skilled in the art will also appreciate the present invention is not limited to the exemplary operating temperature range disclosed. With appropriate passive temperature controlling devices 450, the operating temperature range of the bandwidth transforming node 120 can be reduced or expanded.

In addition to the bandwidth transforming node's 120 ability to withstand harsh outdoor environmental conditions, the bandwidth transforming node 120 can also provide high speed symmetrical data transmissions. In other words, the bandwidth transforming node 120 can propagate the same, bit rates downstream and upstream to and from a network subscriber. This is yet another advantage over conventional networks, which typically cannot support symmetrical data transmissions as discussed in the background section above. Further, the bandwidth transforming node 120 can also serve a large number of subscribers while reducing the number of connections at both the data service hub 110 and the bandwidth transforming node 120 itself.

The bandwidth transforming node 120 also lends itself to efficient upgrading that can be performed entirely on the network side or data service hub 110 side. That is, upgrades to the hardware forming the bandwidth transforming node 120 can take place in locations between and within the data service hub 110 and the bandwidth transforming node 120. This means that the subscriber side of the network (from distribution optical waveguides 185, 190, 195 to the subscriber optical interfaces 140) can be left entirely intact during an upgrade to the bandwidth transforming node 120 or data service hub 110 or both.

The following is provided as an example of an upgrade that can be employed utilizing the principles of the present invention. In one exemplary embodiment of the invention, the subscriber side of the bandwidth transforming node 120 can service six groups of sixteen subscribers each for a total of up to 96 subscribers. Each group of sixteen subscribers can share a data path of about 450 Mb/s speed. Six of these paths represents a total speed of 6×450 Mb/s=2.7 Gb/s. In the most basic form, the data communications path between the bandwidth transforming node 120 and the data service hub 110 can operate at 1 Gb/s. Thus, while the data path to subscribers can support up to 2.7 Gb/s, the data path to the network can only support one Gb/s. This means that not all of the subscriber bandwidth is useable. This is not normally a problem due to the statistical nature of bandwidth usage.

An upgrade could entail increasing the 1 Gb/s data path speed between the bandwidth transforming node 120 and the data service hub 110. This may be done by adding more 1 Gb/s data paths. Adding one more path would increase the data rate to 2 Gb/s, approaching the total subscriber-side data rate. A third data path would allow the network-side data rate to exceed the subscriber-side data rate. In other exemplary embodiments, the data rate on one link could increase from 1 Gb/s to 2 Gb/s and then to 10 Gb/s. Thus, when this happens, a link can be upgraded without adding more optical links.

An increase in data paths (bandwidth) may be achieved by any of the methods known to those skilled in the art. It may be accomplished by using a plurality of fiber transceivers 425 operating over a plurality of optical waveguides, or by using a plurality of fiber transceivers 425 operating over one optical waveguide at a plurality of wavelengths, or by using higher speed fiber transceivers 425 as shown above. Thus, by upgrading the bandwidth transforming node 120 and the data service hub 110 to operate with more than a single 1 Gb/s link, a system upgrade is effected without having to make changes at the subscribers' premises.

Figure 5:
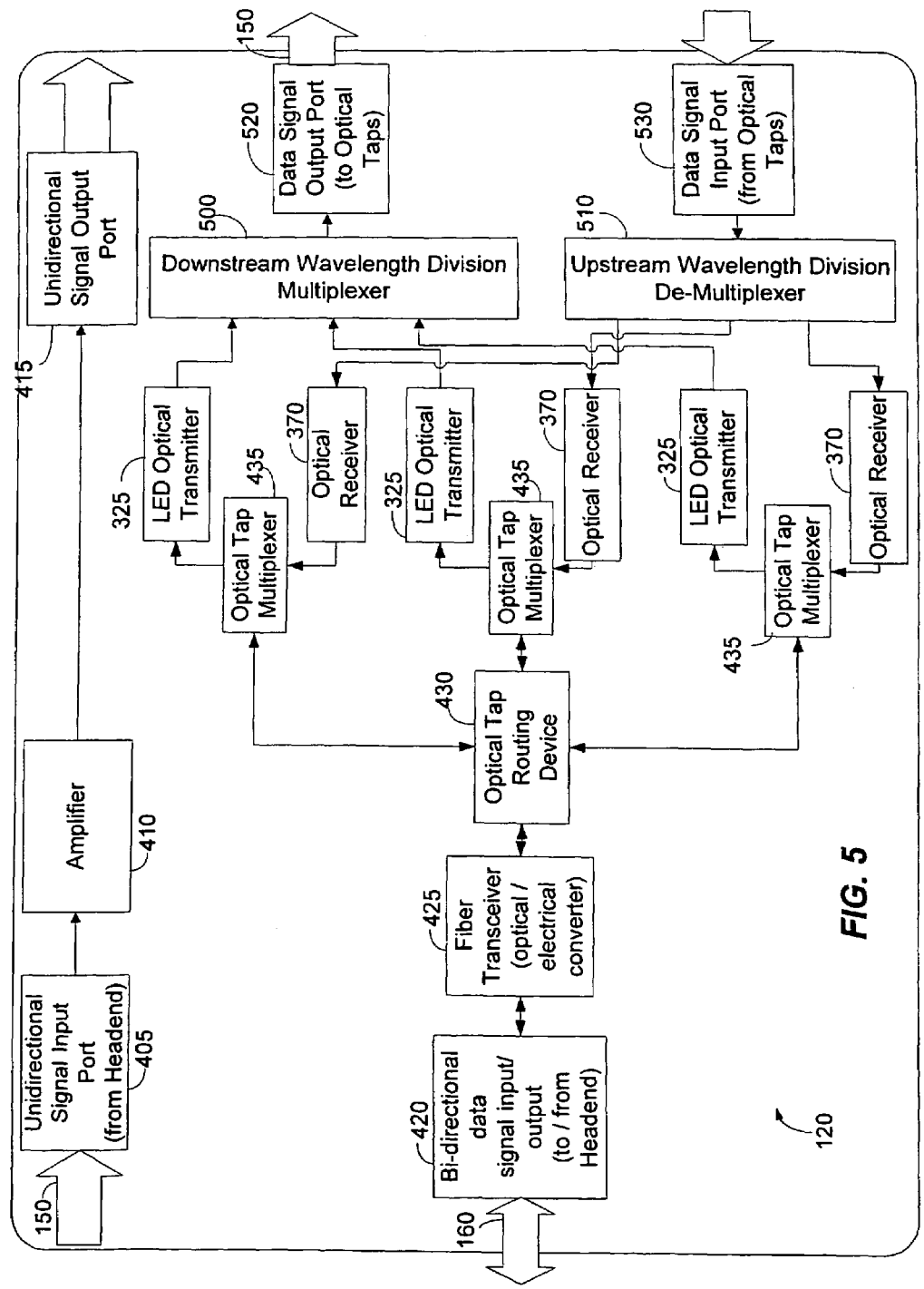
FIG. 5 is a functional block diagram illustrating another exemplary embodiment of an outdoor bandwidth transforming node according to the present invention.

Referring now to FIG. 5, this Figure is a functional block diagram illustrating another exemplary embodiment of an outdoor bandwidth transforming node 120 according to the present invention. Only the differences between FIGS. 4 and 5 will be described with respect to FIG. 5. Accordingly, the bandwidth transforming node 120 can comprise a bi-directional optical signal input/output port 420 that connects the bandwidth transforming node 120 to an optical waveguide 160 that supports bi-directional data flow between the data service hub 110 and the bandwidth transforming node 120. Downstream optical signals can flow through the bi-directional optical signal input/output port 420 to a fiber transceiver 425.

Downstream and upstream electrical signals can be communicated between the fiber transceiver 425 and an optical tap routing device 430. The optical tap routing device 430 can service groups of subscribers with corresponding respective, single ports. The optical taps 130 coupled to respective tap multiplexers 435 can supply downstream optical signals to pre-assigned groups of subscribers who receive the downstream optical signals with the subscriber optical interfaces 140.

The single ports of the optical tap routing device 430 are connected to respective tap multiplexers 435. Electrical signals are communicated between the optical tap routing device 430 and respective tap multiplexers 435. Each tap multiplexer 435 is connected to a respective light emitting diode (LED) optical transmitter 325 and an optical receiver 370.

Each LED optical transmitter 325 can be connected to a downstream wavelength division multiplexer 500. Additionally, each optical receiver 370 can be connected to an upstream wavelength division de-multiplexer 510. The downstream signals propagating from each LED optical transmitter 325 can propagate from the transmitter 325 through the downstream wavelength division multiplexer 500 and out the data signal output port 520 to the optical taps 130. The upstream signals propagating from the optical taps 130 to the data service hub 110 propagate through the data signal input port 530 to the upstream wavelength division de-multiplexer 510 to the optical receiver 370. One advantage the embodiment illustrated in FIG. 5 has over the embodiment illustrated in FIG. 4 is that the embodiment illustrated in FIG. 5 does not use bi-directional splitters 360. Thus, the losses that can occur as a result of using bi-directional splitters 360 can be reduced or avoided.

Upstream optical signals can propagate from the optical taps 130 to the bandwidth transforming node 120 through a data signal input port 530. The upstream signals can then propagate from the data signal input port 530 to the upstream wavelength division de-multiplexer 510, where the optical signals are de-multiplexed and routed to the corresponding optical receiver 370.

The upstream wavelength division de-multiplexer 510 can select a different individual wavelength or wavelengths of light that propagate from a respective optical tap 130. For example, the signal propagating from a first optical tap 130 may be tuned at optical wavelength $\lambda_a$, the signal propagating from a second optical tap 130 may be tuned at optical wavelength $\lambda_b$, the signal propagating from a third optical tap 130 may be tuned at optical wavelength $\lambda_c$, and the signal propagating from an $n^{th}$ optical tap 130 may be tuned at optical wavelength $\lambda_n$. The corresponding receivers operate at the same respective wavelengths.

By propagating information at different wavelengths, one optical waveguide can service a number of individual optical taps 130 that are connected to a like number of optical tap multiplexers 435. Propagating upstream optical signals at different sets of multiple wavelengths enables each subscriber optical interface coupled to a common optical waveguide to transmit simultaneously. As discussed above, this is one advantage over the conventional art, which typically sequences upstream transmissions between subscriber optical interfaces 140 that are part of a particular subscriber grouping. With the present invention, carrier sense transmissions or staggering of upstream transmissions between optical taps 130 are not necessary;

However, in one exemplary embodiment, carrier sense transmissions or staggering of upstream transmissions between subscriber optical interfaces 140 coupled to the same optical tap 130 may be necessary since optical interfaces 140 coupled to the same optical tap 130 typically operate at the same wavelength or wavelength region. In a further exemplary embodiment, the need for carrier sense transmissions or staggering of upstream transmissions between subscriber optical interfaces 140 that are coupled to the same optical tap 130 can be substantially reduced or eliminated if each subscriber optical interface is assigned a different wavelength or wavelength region relative to the other subscriber optical interfaces 140 that are serviced by the same optical tap 130.

Figure 6:
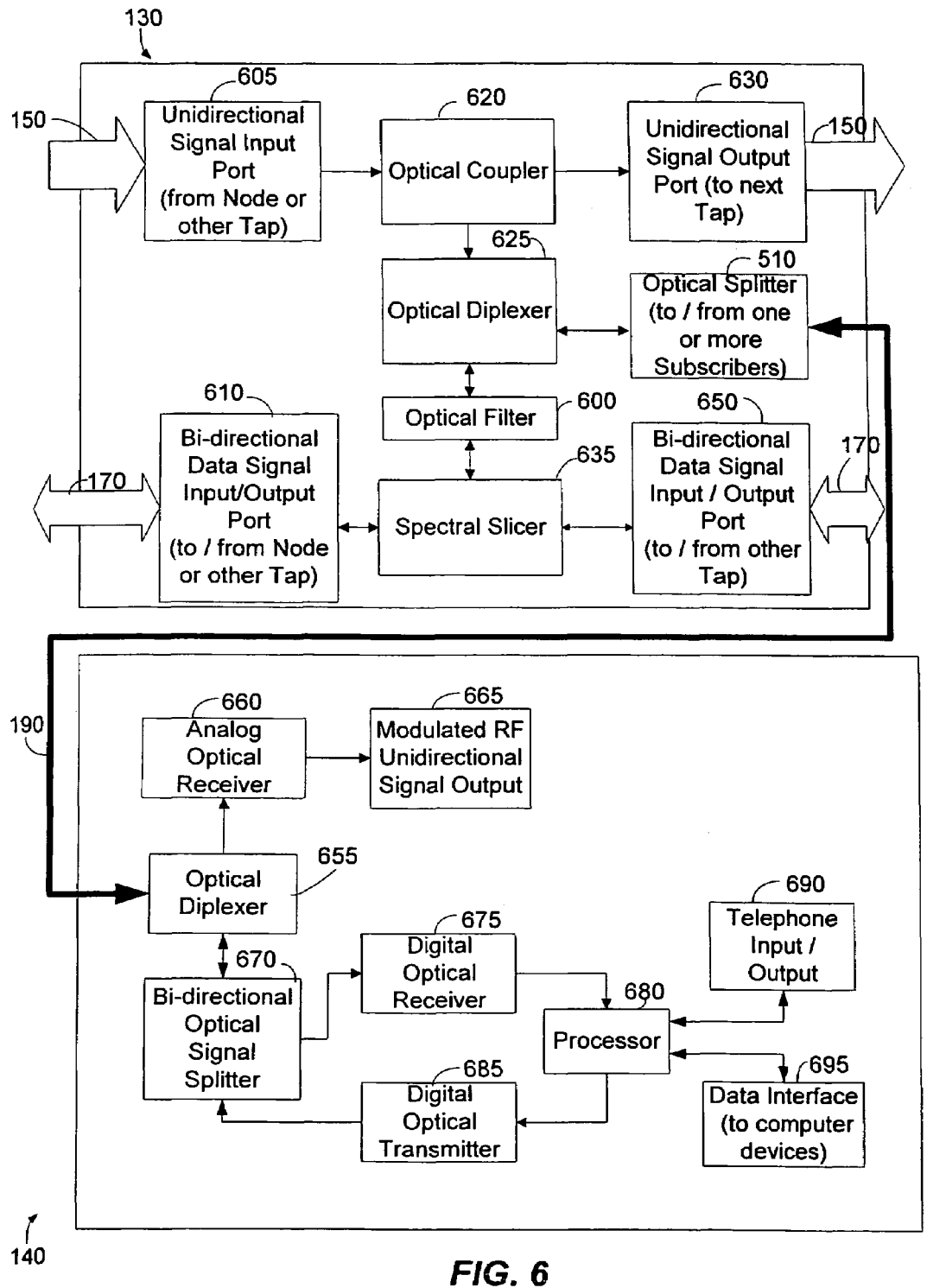
FIG. 6 is a functional block diagram illustrating an optical tap connected to an optical subscriber interface by a single optical waveguide according to one exemplary embodiment of the present invention.

FIG. 6 is a functional block diagram illustrating an optical tap 130 connected to subscriber optical interface 140 by a single optical waveguide 190 according to one exemplary embodiment of the present invention. The optical tap 130 can comprise a unidirectional signal output port 630 and a bi-directional data signal input/output port 650 that are connected to another distribution optical waveguide 170 which can be connected to additional optical taps 130. Additionally, the optical tap 130 can comprise an optical splitter 510 that can be a 4-way or 8-way optical splitter. Other optical taps 130 having fewer or more than 4-way or 8-way splits are not beyond the scope of the present invention. The optical tap 130 can divide downstream optical signals to serve respective subscriber optical interfaces 140. In the exemplary embodiment in which the optical tap 130 comprises a 4-way optical tap, such an optical tap can be of the pass-through type, meaning that a portion of the downstream optical signals is extracted or divided to serve a 4-way splitter contained therein, while the rest of the optical energy is passed further downstream on distribution optical waveguides 150, 170.

The optical tap 130 is an efficient coupler that can communicate optical signals between the bandwidth transforming node 120 and a respective subscriber optical interface 140. Optical taps 130 can be cascaded, or they can be connected in a star architecture from the bandwidth transforming node 120.

The optical tap 130 can also connect to a limited or small number of optical waveguides so that high concentrations of optical waveguides are not present at any particular bandwidth transforming node 120. In other words, in one exemplary embodiment, the optical tap can connect to a limited number of optical waveguides 185, 190, 195 at a point remote from the bandwidth transforming node 120 so that high concentrations of optical waveguides 185, 190, 195 at a bandwidth transforming node 120 can be avoided. However, those skilled in the art will appreciate that the optical tap 130 can be incorporated within the bandwidth transforming node 120.

In one exemplary embodiment, optical signals can propagate from the bandwidth transforming node 120 to the optical tap 130 through the unidirectional signal input port 605 via a broadcast waveguide 150. In another exemplary embodiment, signals can propagate from one optical tap 130 to another optical tap 130 through the unidirectional signal input port 605 via a broadcast waveguide 150. The broadcast signals propagating on the broadcast waveguide 150 can comprise analog and digital modulated radio frequency carriers.

Similarly, in one exemplary embodiment, optical signals can propagate from the bandwidth transforming node 120 to the optical tap 130 through the bi-directional data signal input/output port 610 via a targeted services waveguide 170. In another exemplary embodiment, signals can propagate from one optical tap 130 to another optical tap 130 through the bi-directional signal input/output port 610 via a targeted services waveguide 170. The targeted services waveguide 170 can carry targeted services as baseband digital signals.

The broadcast signals can propagate from the bandwidth transforming node 120 or another optical tap 130 through the input port 605 to an optical coupler 620. The optical coupler 620 can extract signal power from the broadcast waveguide 150 and route the extracted signal to an optical diplexer 625. Signals not extracted from the optical coupler 620 can also propagate to another optical tap 130 through the unidirectional signal output port 630.

The targeted services signals can propagate from the bandwidth transforming node 120 or another optical tap 130 to a spectral slicer 635 through the bi-directional data signal input/output port 610. The spectral slicer 635 can extract wavelengths of light comprising approximately 1310 nanometer wavelengths or wavelength regions near 1310 nanometers. However, wavelengths of light comprising approximately 1550 nanometers could also be used. Those skilled in the art recognize these spectra as particularly well suited for communication applications and that other ranges in the spectra are not beyond the scope of the present invention.

Those optical signals not extracted from the spectral slicer 635 can propagate through the bi-directional data signal input/output port 650 downstream to additional optical taps 130. The extracted optical signals from the spectral slicer 635 can also propagate to the optical diplexer 625 where they can be combined with the broadcast signal from the optical coupler 620. The signal passes to the optical diplexer 625 through a blocking optical filter 600, which is used to prevent upstream optical energy at unused wavelengths from contaminating downstream signals, as will be explained more fully below and in FIG. 12B. Although FIG. 6 illustrates an optical filter 600 disposed between a spectral slicer 635 and an optical diplexer 625, in another exemplary embodiment (not shown), as is understood by one skilled in the art, the optical filter 600 could be physically located within the spectral slicer 635.

The combined signals can propagate from the optical diplexer 625 to an optical splitter 510. The optical splitter 510 divides the combined signal from the diplexer 625 among the one or more subscribers that are connected to the optical tap 130. The combined signal from the diplexer 625 propagates via an optical waveguide 190 to a subscriber optical interface 140, which is typically located in close proximity to a subscriber's home.

The subscriber optical interface 140 functions to convert downstream optical signals received from the optical tap 130 into the electrical domain so that the converted electrical signals can be processed by appropriate communication devices. The subscriber optical interface 140 further functions to convert upstream electrical signals into upstream optical signals that can be propagated along a distribution optical waveguide 190 to the optical tap 130. The subscriber optical interface 140 can comprise an optical diplexer 655 that divides the downstream optical signals received from the distribution optical waveguide 190 between a bi-directional optical signal splitter 670 and an analog optical receiver 660.

In other words, the combined signal that comprises broadcast and targeted services optical signals can propagate downstream from the optical tap 130 to the subscriber optical interface 140 through an optical diplexer 655. The optical diplexer 655 separates the combined signals into two signals, comprising one at about 1310 nanometers and one at about 1550 nanometers. The 1550 nanometer signal, which can comprise the broadcast signal that further comprises a plurality of radio frequency modulated signals in optical form, can propagate downstream to an analog optical receiver 660, and then through a modulated radio frequency unidirectional signal output 665. The modulated radio frequency unidirectional signal output 665 can feed to RF receivers such as television sets (not shown) or radios (not shown). The analog optical receiver 660 can process analog modulated RF transmission as well as digitally modulated RF transmissions for digital TV applications.

In contrast, a 1310 nanometer signal can propagate downstream from the optical diplexer 655 to a bi-directional optical signal splitter 670. The signal splitter 670 routes the downstream targeted services signals to a digital optical receiver 675.

As will be discussed further below, the optical diplexer 655 of the subscriber optical interface 140 can also receive upstream optical signals generated by a digital optical transmitter 685. The digital optical transmitter 685 converts electrical binary/digital signals to optical form so that the optical signals can be transmitted back to the data service hub 110. Conversely, the digital optical receiver 675 converts optical signals into electrical binary/digital signals so that the electrical signals can be handled by processor 680. The optical transmitters 685 produce the upstream optical signals that are propagated towards the optical taps 130. The optical transmitters 685 can comprise one or more of the Volgatech SLD series diodes or the SLD-56-MP from Superlum, Ltd., similar to the optical transmitters 325 of the bandwidth transforming node 120. The digital optical receivers 675 can comprise photodiodes or photoreceptors, similar to optical receivers 370 of the bandwidth transforming node 120.

The bi-directional optical signal splitter 670 can propagate combined optical signals in their respective directions. That is, downstream optical signals entering the bi-directional optical signal splitter 670 from the optical diplexer 655 can be propagated to the digital optical receiver 675. Upstream optical signals entering the bi-directional splitter 670 from the digital optical transmitter 685 can be sent to the optical diplexer 655 and then to the optical tap 130. As mentioned above, the bi-directional optical signal splitter 670 is connected to a digital optical receiver 675 (comprising one or more photoreceptors or photodiodes) that can convert downstream data optical signals into the electrical domain. Meanwhile the bi-directional optical signal splitter 670 is also connected to a digital optical transmitter 685 that converts upstream electrical signals into the optical domain.

The digital optical transmitter 685 emits optical signals comprising a broad spectrum of wavelengths. The wavelengths transmitted upstream from the digital optical transmitter 685 can comprise the same wavelengths transmitted downstream to the digital optical receiver 675. The spectrum transmitted upstream can be selected or extracted by the spectral slicer 635 working in combination with optical filter 600. Further details of the operation of spectral slicer will be discussed below with respect to FIGS. 12A-12C.

The output of the digital optical transmitter 685 of an optical interface 140 of a subscriber grouping (where optical interfaces 140 of a subscriber grouping are coupled to the same optical tap 130) typically emits signals at wavelengths including those used in the downstream direction by the other optical interfaces 140 of the subscriber grouping. The optical filter 600 can block unwanted wavelengths emitted upstream from the digital optical transmitter 685, and thereby prevents the unwanted wavelengths (the optical power at wavelengths other than the wavelength to which the spectral slicer 635 is tuned) from being propagated through the spectral slicer 635 in the downstream direction. In this way, the filter 600, which is tuned to the same wavelengths as the spectral slicer 635, prevents the unwanted upstream wavelengths from interfering with other signals propagated to downstream users.

The functionality of the filter 600 compared to the spectral slicer 635 can be characterized as follows: the filter 600 may be considered as a blocking type filter whereas the spectral slicer may be characterized as a pass thru filter. The blocking filter 600 stops or prevents unwanted wavelengths from passing through the filter 600 while the spectral slicer 635 passes unwanted wavelengths therethrough and reflects the desired or wanted wavelengths to another waveguide.

The digital optical receiver 675 and digital optical transmitter 685 can be connected to a processor 680 that selects data intended for the instant subscriber optical interface 140 based upon an embedded address. The data handled by the processor 680 can comprise one or more of telephony and data services such as an Internet service. The processor 680 is connected to a telephone input/output 690 that can comprise an analog interface. The processor 680 is also connected to a data interface 695 that can provide a link to computer devices, set top boxes, ISDN phones, and other like devices. Alternatively, the data interface 695 can comprise an interface to a Voice over Internet Protocol (VoIP) telephone or Ethernet telephone. The data interface 695 can comprise one of Ethernet's (10BaseT, 100BaseT, Gigabit) interface, HPNA interface, a universal serial bus (USB) an IEEE1394 interface, an ADSL interface, and other like interfaces.

The present invention can propagate the optical signals at various wavelengths. However, the wavelength regions discussed are practical and are only illustrative of exemplary embodiments. Those skilled in the art will appreciate that other wavelengths that are either higher or lower than or between the 1310 nanometer and 1550 nanometer wavelength regions are not beyond the scope of the present invention.

Figure 7:
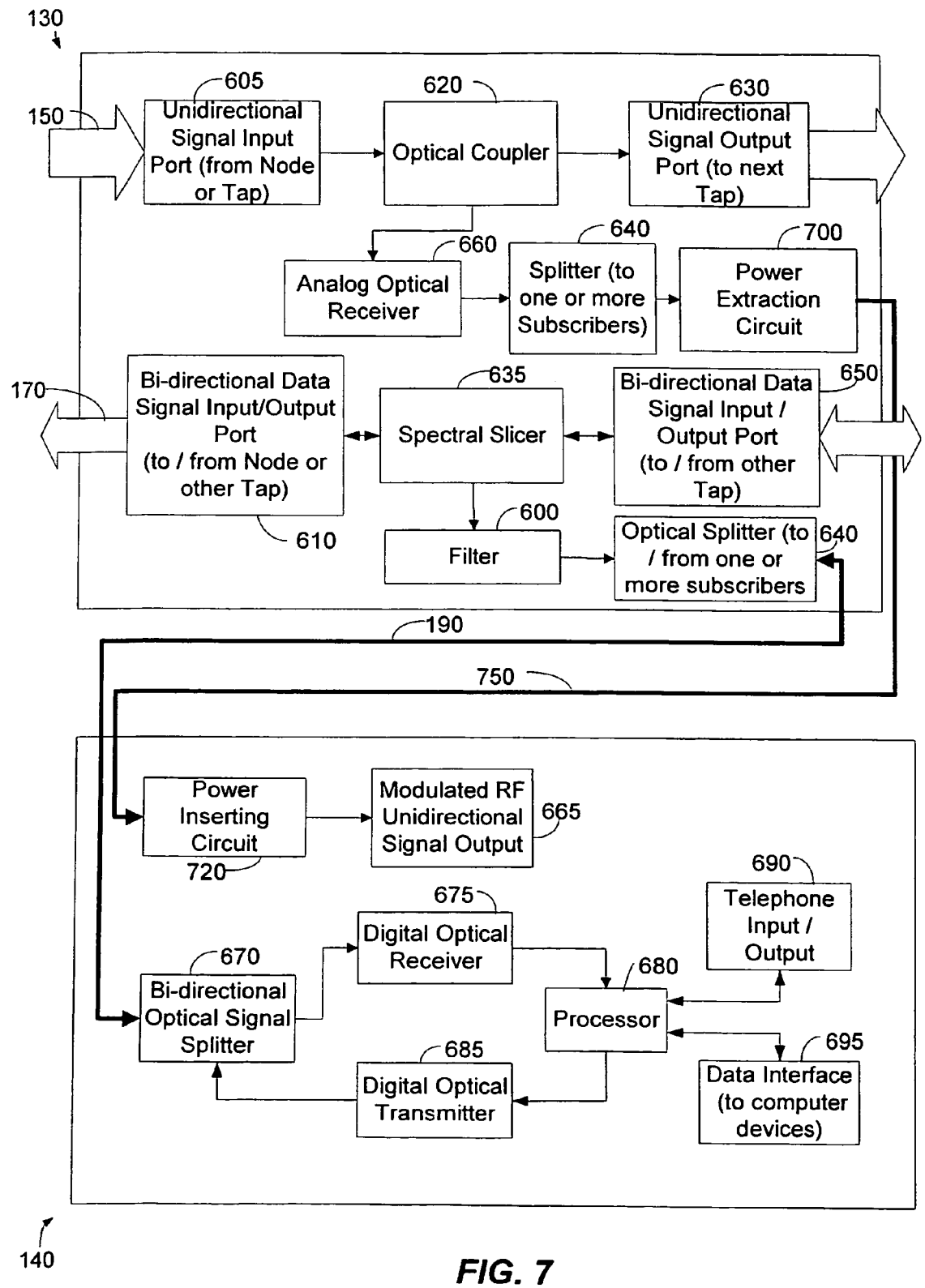
FIG. 7 is a functional block diagram illustrating another optical tap connected to a subscriber interface by both an optical waveguide and a wire conductor according to another exemplary embodiment of the present invention.

Referring now to FIG. 7, this figure is a functional block diagram illustrating another optical tap 130 connected to a optical subscriber interface 140 by both an optical waveguide 190 and a wire conductor 750 according to another exemplary embodiment of the present invention. Only the differences between FIGS. 6 and 7 will be discussed with respect to FIG. 7. As discussed above and as illustrated in FIG. 6, in one exemplary embodiment of the present invention, an analog optical receiver 660 can be installed or housed in the subscriber optical interface 140 to process analog modulated RF transmission as well as digitally modulated RF transmissions for digital TV applications. Not only can the signals be analog modulated (such; conventional NTSC television transmissions) or digitally modulated (such as those transmitted using the ATSC digital format using VSB modulation), but they can also be in a modified form (such as the format used by the cable television industry that uses QAM modulation), and the modulation can be mixed as the system operator sees fit.

However, in one exemplary embodiment of the present invention the analog optic receiver 660 can be located in the optical tap 130. One advantage of this exemplary embodiment over the exemplary embodiment described in FIG. 6 is that the analog optical receiver 660 optical tap 130 can serve all subscribers connected to the optical tap 130. An addition advantage of this exemplary embodiment over the exemplary embodiment discussed in Figure (with the analog receiver 660 located in the subscriber optical interface 140), is that the embodiment illustrated in FIG. 7 can reduce or eliminate any losses of signal strength that can occur in some of the devices used in FIG. 6. For example, as is known by those skilled in the art, the power strength of a signal could be reduced as that signal passes through optical splitter optical couplers, and diplexers. Because the design in FIG. 6 relies on these devices, requires that the optical amplifier 410 in the bandwidth transforming node 120 to compensate for these power losses that could occur. As is known to those skilled in the art, the cost of a amplifier is related to the output level required. Thus, if the output level that is required can be reduced, significant cost savings can be achieved.

As noted above, the analog optical receiver 660 can serve all homes connected to the optical splitter 640. The optical tap 130 is powered from circuitry 720 added in the subscriber optical interface 140. Additionally, steering diodes (not shown) located in the optical tap 13 can combine the power from each subscriber to operate the common equipment in the analog optical receiver 660 through the power extraction circuit 700.

In another exemplary embodiment, the optical tap 130 can be powered using a cable that brings power from the bandwidth transforming node 120 or another place in the distribution plant. This cable can be co-located with the broadcast waveguides 150 and targeted service waveguides 170 or it can be routed separately.

The signals not extracted from the spectral slicer 635 can propagate through the bi directional data signal input/output port 650 downstream to additional optical taps 130. The extracted signal from the spectral slicer 635 can also propagate to the filter 600, where the filter 600 prevents unwanted wavelengths from passing therethrough. The signal can then propagate from the filter 600 to the subscriber optical interface 140 via an optical splitter 640. The optical splitter 640 can divide downstream optical signals among one or more subscriber optical interfaces 140.

The subscriber optical interface 140 can comprise a power insertion circuit 720, which powers the analog optical receiver 660 of the optical tap 130. The subscriber optical interface 140 can also comprise a modulated RF unidirectional signal output 665 for carrying broadcast signals to broadcast receivers, such as televisions or radios.

The targeted services signals can propagate downstream to the subscriber optical interface 140 where they are processed by a bi-directional optical signal splitter 670. The signal splitter 670 routes the downstream signals to a digital optical receiver 675.

As will be discussed further below, the spectral slicer 635 can also receive upstream optical signals generated by a digital optical transmitter 685. The digital optical transmitter 685 converts electrical binary/digital signals to optical form so that the optical signals can be transmitted back to the data service hub 110; Conversely, the digital optical receiver 675 converts optical signals into electrical binary/digital signals so that the electrical signals can be handled by processor 680.

Figure 8:
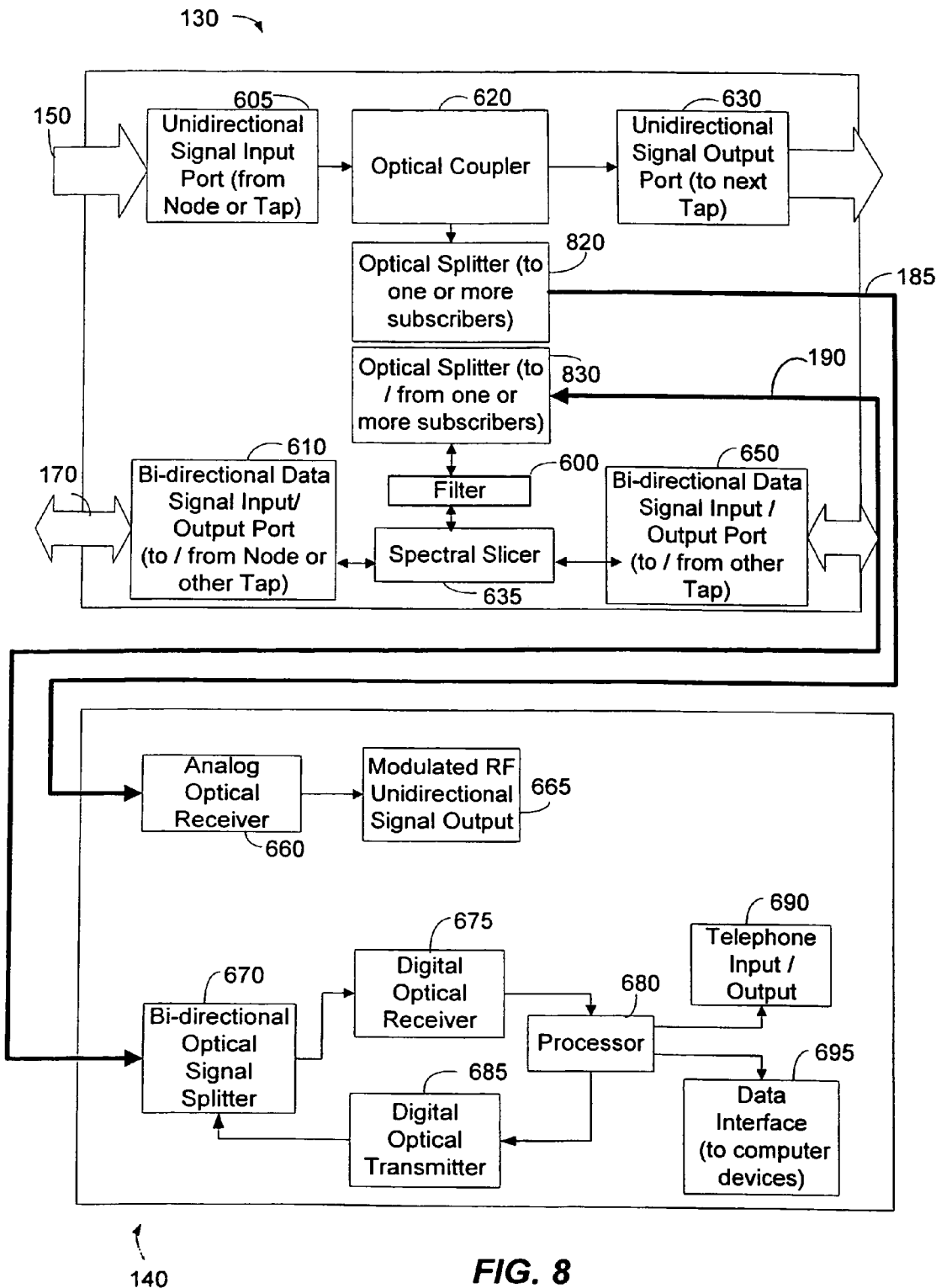
FIG. 8 is a functional block diagram illustrating another optical tap connected to a bandwidth transforming node by two optical waveguides according to another exemplary embodiment of the present invention.

Referring now to FIG. 8, this figure is a functional block diagram illustrating another optical tap 130 connected to a bandwidth transforming node 120 by two optical waveguides 150, 170 according to another exemplary embodiment of the present invention. Only the differences between FIGS. 6 and 8 will be discussed with respect to FIG. 8. Accordingly, one advantage the embodiment illustrated in FIG. 8 has over the embodiment illustrated in FIG. 6 is the design in FIG. 8 avoids the use of any diplexers. Thus, the losses that could possibly occur as a result of using diplexers can be reduced or substantially eliminated.

In FIG. 8, an optical coupler 620 can extract a portion of the downstream unidirectional signal and send the extracted signal to an optical splitter 820. The remainder of the downstream signal can propagate to other optical taps 130 further downstream via a unidirectional signal output port 630. An optical splitter 820 can split the optical signal from the optical coupler 620 and then can send it to a subscriber over a downstream optical waveguide 185. The subscriber optical interface 140 (which is located at the subscriber) receives the downstream broadcast signal from the downstream optical splitter 820 and routes the signal to an analog optical receiver 660. The signal from the analog optical receiver 660 can propagate to the subscriber via a modulated RF unidirectional signal output 665.

Targeted services signals can propagate downstream to the optical tap 130 from the bandwidth transforming node 120 (or another optical tap 130) via a targeted services waveguide 170. The targeted services signals enter the optical tap 130 through a bi-directional data signal input/output port 610 and can propagate to a spectral slicer 635. This spectral slicer 635 operates as described above, in that it extracts certain prescribed wavelengths that are assigned to a reduced set of subscribers. The optical splitter 830 receives the extracted wavelengths from the spectral slicer 635 via optical filter 600, and splits the signals to serve the plurality of homes serviced from this optical tap 130. The optical splitter 830 and the spectral slicer 635 can also receive upstream signals propagating from the subscriber optical interface 140 to the data service hub 110 via the bi-directional data signal input/output port 650.

The bi-directional optical signal splitter 670 of the subscriber optical interface 140 can propagate combined optical signals in their respective directions. That is, downstream optical signals entering the bi-directional optical signal splitter 670 from the spectral slicer 635 can be propagated to the digital optical receiver 675. Upstream optical signals entering the optical signal splitter 670 from the digital optical transmitter 685 can be sent to the optical tap 130. These upstream optical signals propagate from the digital optical transmitter 685 to the optical tap 130 by first propagating through a bi-directional signal splitter 670. The upstream optical signals originating from a plurality of subscribers can be further combined in the optical splitter 830 and spectral slicer 635 located in the optical tap 130. The combined upstream signals can then propagate to other upstream optical taps 130 or to the data service hub 110 after passing through the bi-directional data signal input-output port 610 along the targeted services waveguide 170.

Figure 9:
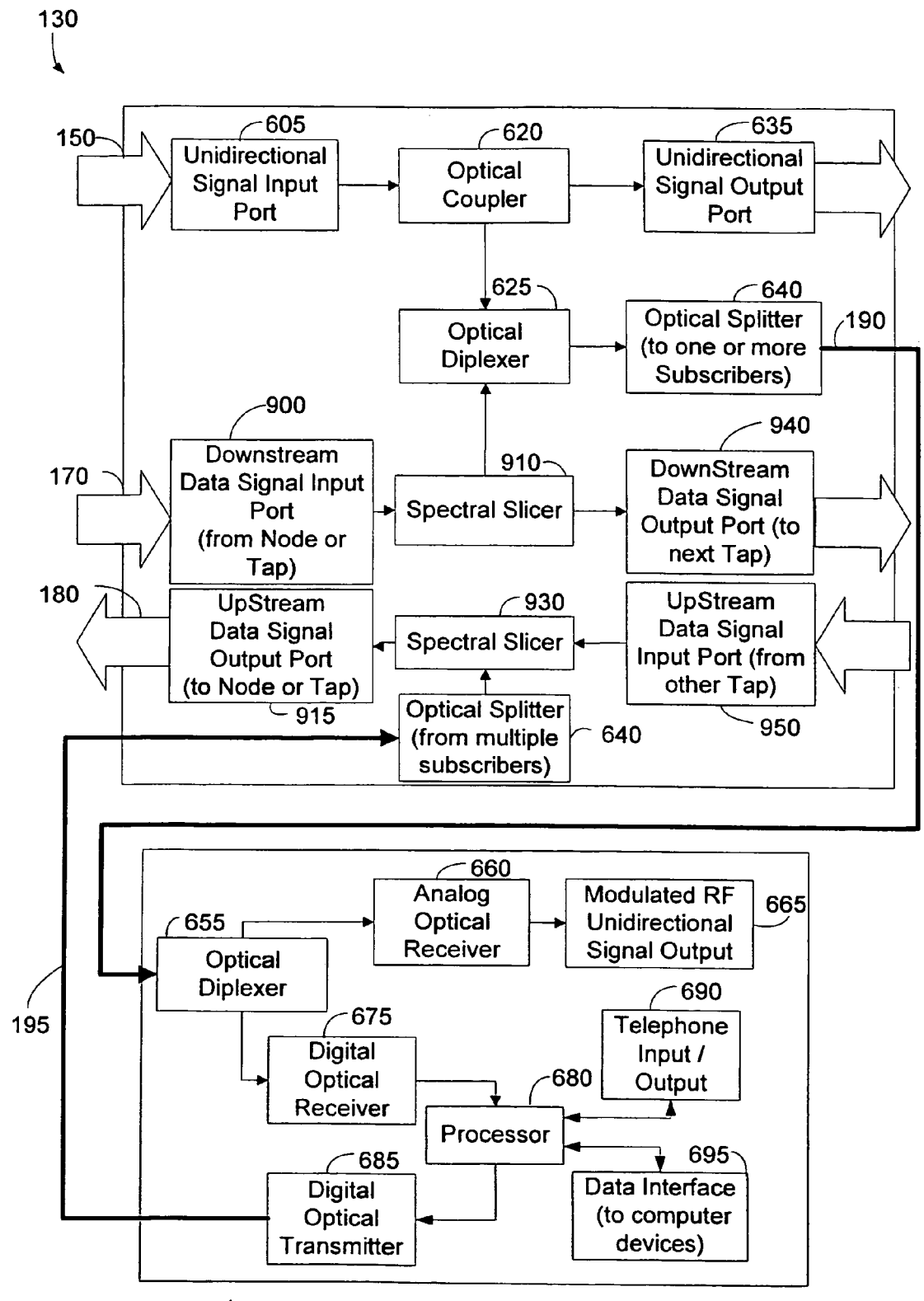
FIG. 9 is a functional block diagram illustrating another optical tap connected to a bandwidth transforming node by two optical waveguides according to another exemplary embodiment of the present invention.

Referring now to FIG. 9, this figure is a functional block diagram illustrating another optical tap 130 connected to a bandwidth transforming node 120 by three optical waveguides 150, 170, 180 according to another exemplary embodiment of the present invention. In one exemplary embodiment, signals can propagate from the bandwidth transforming node 120 to the optical tap 130 through the unidirectional signal input port 605 via the broadcast waveguide 150. In another exemplary embodiment, signals can propagate from one optical tap 130 to another optical tap 130 through the unidirectional signal input port 605 via the broadcast waveguide 150. The broadcast signals propagating on the broadcast waveguide 150 are analog and digital modulated radio frequency carriers.

In another exemplary embodiment, signals can propagate from the bandwidth transforming node 120 to the optical tap 130 through the downstream data signal input port 900 via the downstream targeted services waveguide 170. In another exemplary embodiment, signals propagate from one optical tap 130 to another optical tap 130 through the downstream data signal input port 900 via the downstream targeted services waveguide 170.

In contrast, upstream signals can propagate from the subscriber optical interface 140 to the data service hub 110 through the optical splitter 640 in the optical tap 130 over an upstream targeted services waveguide 195. In this exemplary embodiment, a blocking filter 600 is not needed, because the optical signals propagating upstream from the digital optical transmitter 685 that are not extracted by the spectral slicer 930 typically do not propagate downstream. In this exemplary embodiment there are no intentional downstream signals on optical waveguide 180. Therefore, any downstream signals that could be generated and propagate along optical waveguide 180 in the downstream direction are of no consequence.

The downstream broadcast signals can propagate from the bandwidth transforming node 120 or another optical tap 130 through the input port 605 to an optical coupler 620. The optical coupler 620 extracts signal power from the broadcast waveguide 150 and routes the extracted signal to the optical diplexer 625. Signals not extracted by the optical coupler 620 can also propagate to another optical tap 130 through the unidirectional signal output port 635.

Downstream targeted services signals can propagate from the bandwidth transforming node 120 or another optical tap 130 to a downstream spectral slicer 910 through the downstream data signal input port 900. The downstream spectral slicer 910 extracts one or more wavelengths of light located approximately at 1310 nanometers. However, other wavelengths of light located approximately at 1550 nanometers could also be used. Those skilled in the art recognize these spectra as particularly well suited for communication applications and that other ranges of wavelengths are not beyond the scope of the present invention.

As mentioned above, the remaining optical signals not extracted from the spectral slicer 910 can be propagated downstream through the downstream data signal output port 940 to additional optical taps 130. The extracted signal from the spectral slicer 910 can also be propagated to the optical diplexer 625, where it can be combined with the downstream broadcast signal from the optical coupler 620. The combined broadcast/targeted services signal can propagate from the optical diplexer 625 to an optical splitter 640. The optical splitter 640 divides the combined signal from the diplexer 625 among the one or more subscribers who are connected to the optical tap 130. The combined signal from the diplexer 625 can propagate via a single waveguide 190 to a subscriber optical interface 140, which is located in close proximity to a subscriber.

The subscriber optical interface 140 can comprise an optical diplexer 655 that divides the downstream optical signals received from the distribution optical waveguide 190 between a digital optical receiver 675 and an analog optical receiver 660. In other words, the combined signal propagates downstream from the optical tap 130 to the subscriber optical interface 140 through an optical diplexer 655. The optical diplexer 655 separates the combined signal into two signals, one at about 1310 nanometers and one at about 1550 nanometers. The 1550 nanometer signal, which can comprise a plurality of radio frequency modulated signals in optical form (also referred to as a broadcast signal), propagates downstream to an analog optical receiver 660, and then through a modulated radio frequency unidirectional signal output 665. The output of the analog optical receiver 660 is a conventional electrical signal containing a plurality of analog and digital modulated broadcast signals. The analog optical receiver 660 can process analog modulated RF transmissions as well as digitally modulated RF transmissions for digital TV applications.

In contrast, the 1310 nanometer signal can propagate downstream from the optical diplexer 655 to a digital optical receiver 675. The digital optical receiver 675 converts optical signals into electrical binary/digital signals so that the electrical signals can be handled by a processor 680. The digital optical receiver 675 can comprise one or more photoreceptors or photodiodes that convert optical signals into the electrical domain. The digital optical transmitter 685 can comprise one or more LEDs.

The optical tap 130 can also receive upstream data signals propagating upstream from the subscriber to the data service hub 110 through a digital optical transmitter 685. More specifically, signals can propagate from a telephone input/output 690 and a data interface 695 to a processor 680. The processor can send upstream signals through a digital optical transmitter 685 to the optical tap 130 through an optical splitter 640. The optical splitter in turn sends the signal to an upstream spectral slicer 930. From the spectral slicer 930 the signal can propagate further upstream via the upstream data signal output port 915 and along the upstream targeted services waveguide 180. The digital optical transmitter 685 converts upstream electrical binary/digital signals to optical form so that the optical signals can be transmitted back to the data service hub 110. Additionally, upstream signals can propagate from other optical taps 130 to the data service hub 110 through the upstream data signal input port 950.

As noted above, the present invention can propagate the optical signals at various wavelengths. However, the wavelength regions discussed above are practical and are only illustrative of exemplary embodiments. Those skilled in the art will appreciate that other wavelengths that are either higher or lower than or between the 1310 nanometer and 1550 nanometer wavelength regions are not beyond the scope of the present invention.

Figure 10:
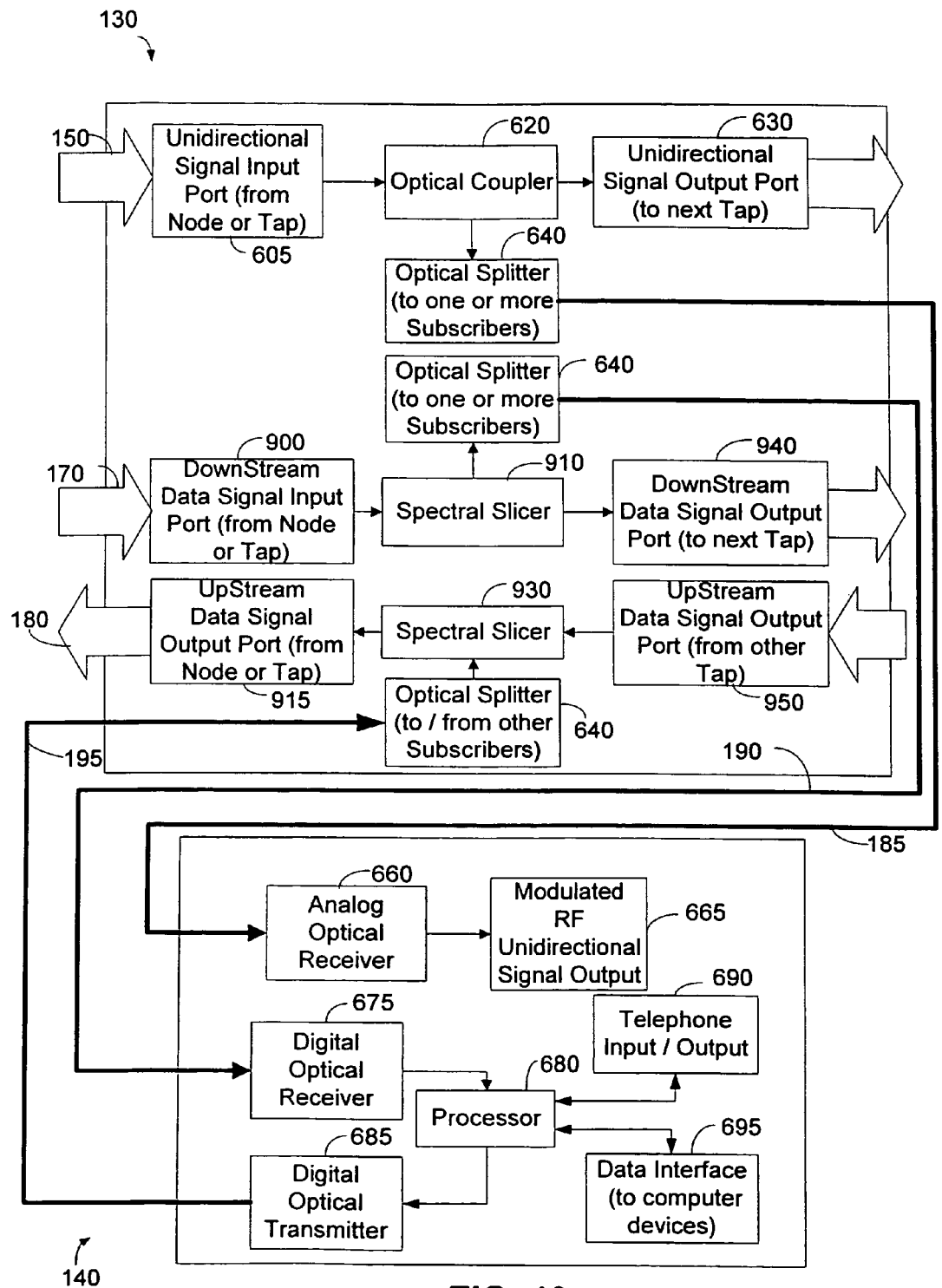
FIG. 10 is a functional block diagram illustrating another optical tap connected to a bandwidth transforming node by three optical waveguides according to another exemplary embodiment of the present invention.

FIG. 10 is a functional block diagram illustrating another optical tap 130 connected to a bandwidth transforming node 129 by three optical waveguides 150, 170, 180 according to another exemplary embodiment of the present invention. Only the differences between FIGS. 6 and 10 will be discussed with respect to FIG. 10. In one exemplary embodiment, signals can propagate from the bandwidth transforming node 120 to the optical tap 130 through the unidirectional signal input port 605 via the broadcast waveguide 150. In another exemplary embodiment, signals can propagate from one optical tap 130 to another optical tap 130 through the unidirectional signal input port 605 via the broadcast waveguide 150. The broadcast signals propagating on the broadcast waveguide 150 comprise analog and digital modulated radio frequency optical signals.

Similarly, downstream targeted services signals can propagate from the bandwidth transforming node 120 to the optical tap 130 through the downstream data signal input port 900 via the downstream targeted services waveguide 170. In another exemplary embodiment, downstream targeted services signals can propagate from one optical tap 130 to another optical tap 130 through the downstream data signal input port 900 via the downstream targeted services waveguide 170.

Upstream targeted services signals can propagate from the subscriber optical interface 140 to the data service hub 110 through the upstream data signal output port 915 in the optical tap 130 over an upstream targeted services waveguide 180. In another exemplary embodiment, signals can propagate from another optical tap 130 to the data service hub 110 through the upstream data signal output port 915.

The downstream broadcast signals can propagate from the bandwidth transforming node 120 or another optical tap 130 through the input port 605 to an optical coupler 620. The optical coupler 620 extracts downstream signals from the broadcast waveguide 150 and routes the extracted signals to an optical splitter 640. Signals not extracted by the optical coupler 620 can also propagate to another optical tap 130 through the unidirectional signal output port 630.

The targeted services signals propagate from the bandwidth transforming node 120 or another optical tap 130 to a downstream spectral slicer 910 through the downstream data signal input port 900. The downstream spectral slicer 910 extracts wavelengths of light. The wavelengths not extracted from the spectral slicer 910 can propagate downstream through the downstream data signal output port 940 to additional optical taps 130. The extracted wavelengths or signals from the spectral slicer 910 can propagate to a downstream optical splitter 640, where it is divided by the optical splitter 640 among the one or more subscribers who are connected to the optical tap 130. The signal from the optical splitter 640 can propagate via a single waveguide 190 to a subscriber optical interface 140, which is located in close proximity to a subscriber.

The downstream broadcast signal can propagate from an optical splitter 640 via the downstream broadcast waveguide 185 to an analog optical receiver 660 in the subscriber optical interface 140. The signal can then propagate from the analog optical receiver 660 through a modulated radio frequency unidirectional signal output 665. The output of the analog receiver 660 is a conventional electrical signal containing a plurality of analog and digital modulated broadcast signals.

The targeted services signal can propagate downstream from a downstream optical splitter 640 over a downstream targeted services waveguide 190 to a digital optical receiver 675 located in the subscriber optical interface 140. The digital optical receiver 675 converts optical signals into electrical binary/digital signals so that the electrical signals can be handled by processor 680. The digital optical receiver 675 can comprise one or more photoreceptors or photodiodes that convert optical signals into the electrical domain.

The optical tap 130 can also receive upstream data signals propagating upstream from the subscriber to the data service hub 110 through a digital optical transmitter 685. More specifically, signals propagate from a telephone input/output 690 and a data interface 695 to a processor 680. The processor sends upstream signals through a digital optical transmitter 685 to the optical tap 130 via an upstream targeted services waveguide 195 through an optical splitter 640. The optical splitter, in turn, sends the signal to an upstream spectral slicer 930. From the spectral slicer 930, the signal propagates further upstream via the upstream data signal output port 915 and along the upstream targeted services waveguide 180. The digital optical transmitter 685 converts upstream electrical binary/digital signals to optical form so that the optical signals can be transmitted back to the data service hub 110.

The digital optical receiver 675 and digital optical transmitter 685 are connected to a processor 680 that selects data intended for the instant subscriber optical interface 140 based upon an embedded address. The data handled by the processor 680 can comprise one or more of telephony and data services such as an Internet service.

Figure 11:
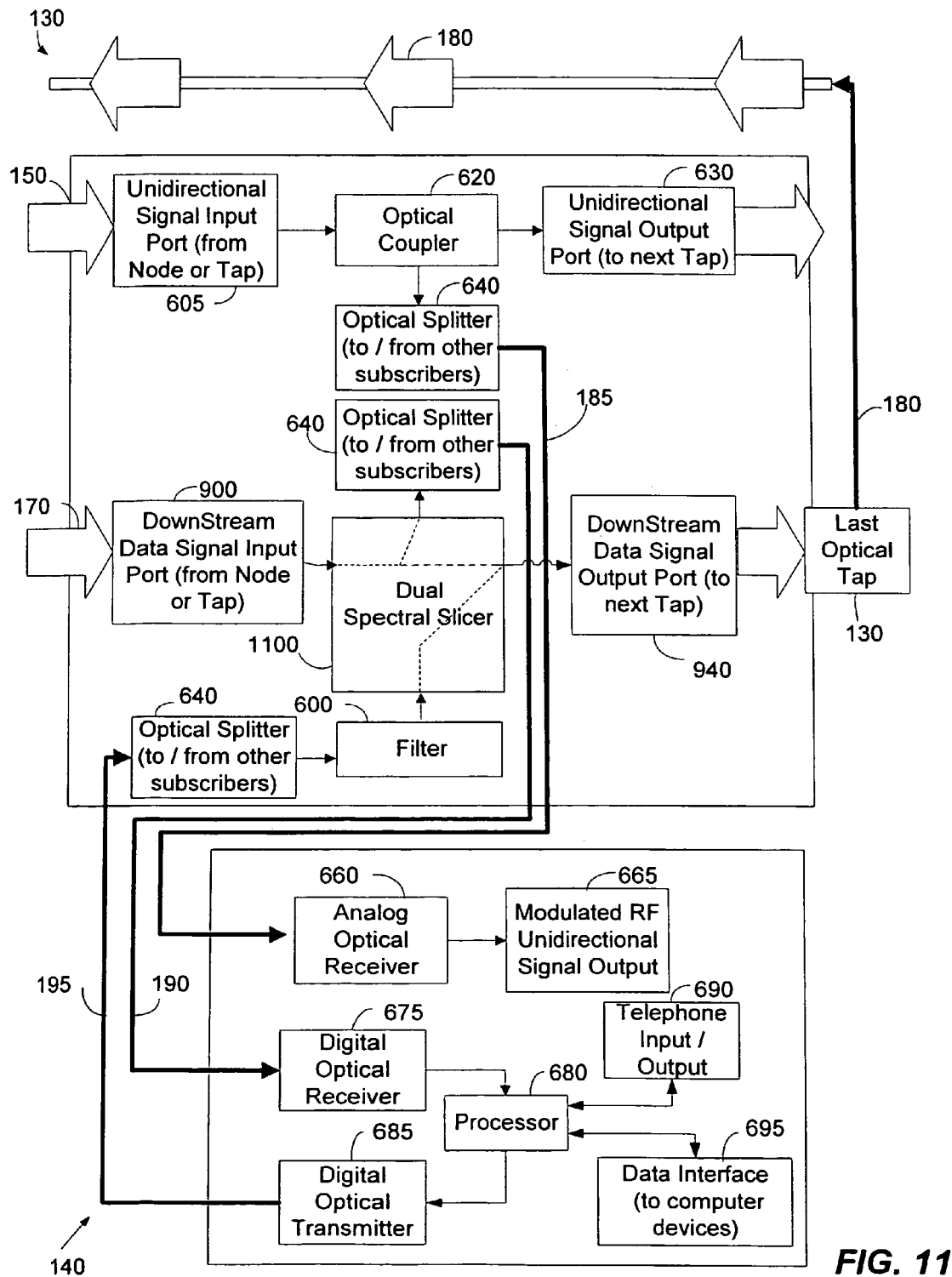
FIG. 11 is a functional block diagram illustrating yet another optical tap connected to a bandwidth transforming node by three optical waveguides according to another exemplary embodiment of the present invention.

FIG. 11 is a functional block diagram illustrating another optical tap 130 connected to a bandwidth transforming node 120 by three optical waveguides 150, 170, 180 according to another exemplary embodiment of the present invention. Only the structural differences between FIGS. 6 and 11 will be discussed with respect to FIG. 11. One advantage of the embodiment illustrated in FIG. 11 over the embodiment illustrated in FIG. 9 is lower cost through the use of a dual spectral slicer 1100 (as opposed to using a downstream spectral slicer 910 and an upstream spectral slicer 930). An advantage of the embodiment illustrated in FIG. 11 over the embodiment illustrated in FIG. 10 is that the upstream targeted services waveguide 180 remains continuous; it does not need to be broken at every optical tap 130.

In one exemplary embodiment of the present invention, broadcast signals can propagate from the bandwidth transforming node 120 to the optical tap 130 through the unidirectional signal input port 605 via the broadcast waveguide 150. In another exemplary embodiment, broadcast signals can propagate from one optical tap 130 to another optical tap 130 through the unidirectional signal input port 605 via the broadcast waveguide 150.

In one exemplary embodiment, downstream targeted services signals can propagate from the bandwidth transforming node 120 to the optical tap 130 through the downstream data signal input port 900 via the downstream targeted services waveguide 170. In another exemplary embodiment, signals propagate from one optical tap 130 to another optical tap 130 through the downstream data signal input port 900 via the downstream targeted services waveguide 170.

The broadcast signals can propagate from the bandwidth transforming node 120 or another optical tap 130 through the unidirectional signal input port 605 to an optical coupler 620. The optical coupler 620 extracts signals from the broadcast waveguide 150 and routes the extracted signals to an optical splitter 640. Broadcast signals not extracted from the optical coupler 620 can also propagate to another optical tap 130 through the unidirectional signal output port 630. The downstream broadcast signals propagate from an optical splitter 640 via the downstream broadcast waveguide 185 to an analog optical receiver 660 in the subscriber optical interface 140. The downstream broadcast signal then propagates from the analog optical receiver 660 through a modulated radio frequency unidirectional signal output 665 to one or more television sets located at the subscriber end.

Upstream data signals can propagate from the subscriber optical interface 140 to the data service hub 110 through a filter 600 in the optical tap 130 over an upstream targeted services waveguide 195. The upstream signals can propagate to the data service hub 110 via an upstream targeted services waveguide 180 from the last optical tap 130. Until reaching the last optical tap 130 in a cascade of taps, the upstream optical signals propagate downstream on downstream optical waveguide 170, using wavelengths that are permitted to pass through the dual spectral slicer 1100. The targeted services waveguides 170, 180 carry targeted services as baseband digital signals.

The downstream targeted services signals can propagate from the bandwidth transforming node 120 or another optical tap 130 to a dual spectral slicer 1100 through the downstream data signal input port 900. The dual spectral slicer 1100 extracts wavelengths of light at this optical tap 130, while other wavelengths can be extracted at other optical taps 130 in the optical network system 100. The wavelengths not extracted can propagate downstream through the dual spectral slicer 1100 and through the downstream data signal output port 940 to additional optical taps 130. The extracted signal from the dual spectral slicer 1100 can propagate to an optical splitter 640 where it is divided by the optical splitter 640 among the one or more subscribers that are connected to the optical tap 130. The signal from the optical splitter 640 propagates via a single waveguide 190 to a subscriber optical interface 140, which is located in close proximity to a subscriber's home or in another convenient location.

The targeted services signal propagates downstream from the optical splitter 640 over a downstream targeted services waveguide 190 to a digital optical receiver 675 located in the subscriber optical interface 140. The digital optical receiver 675 converts optical signals into electrical binary/digital signals so that the electrical signals can be handled by processor 680. The digital optical receiver 675 can comprise one or more photoreceptors or photodiodes that convert optical signals into the electrical domain.

The optical tap 130 can also receive upstream data signals propagating upstream from the subscriber to the data service hub 110 through a digital optical transmitter 685. More specifically, signals propagate from a telephone input/output 690 and a data interface 695 to a processor 680. The processor sends upstream signals through a digital optical transmitter 685 to the optical tap 130 via an upstream targeted services waveguide 195 to an optical splitter 640. The optical splitter 640 (a bi-directional device) combines the outputs of other optical interfaces 140 attached to this optical tap 130.

A filter 600 located between the optical splitter 640 and the dual spectral slicer 1100 blocks optical power at wavelengths not selected by the dual spectral slicer 1100 to prevent interference with other optical signals. The optical splitter 640 in turn sends the signal to a dual spectral slicer 1100. From the dual spectral slicer 1100, the signal propagates in the downstream direction on the targeted services downstream waveguide 170 until it reaches the farthest optical tap 130 in a chain of optical taps 130. At this point, all downstream signals are propagated back up to the bandwidth transforming note 120 on the upstream targeted services waveguide 180.

Figure 12A:
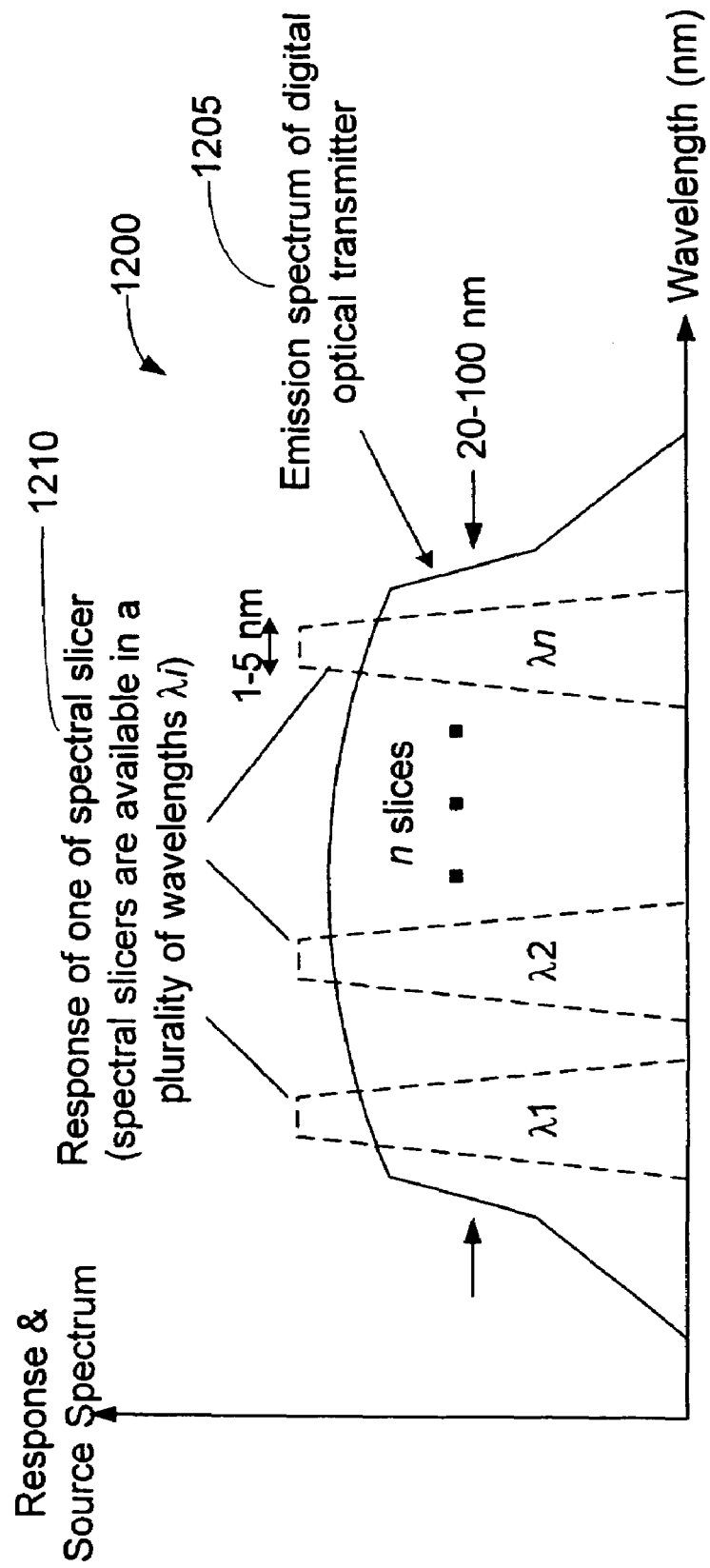
FIGS. 12A-12C illustrate the operation of spectral slicers that are present within optical taps of the present invention.

Referring now to FIG. 12A, this figure illustrates the operation of spectral slicers 635 that are present within the optical taps 130 of the present invention. More specifically, this figure illustrates a plot 1200 of wavelength versus response and source spectrum of a digital optical transmitters 325, 685. The emission spectrum 1205 of the optical transmitters 325, 685 is shown as a solid line. The width of the response corresponds to the wavelength bandwidth of the transmitters 325, 685.

The response 1210 of a spectral slicer 635 and also optical filter 600 is shown with dashed lines. The response of spectral slicer 635 shown in FIG. 12A is the response between the common port, PC, and a second Port, P2, as defined in FIG. 12B. The response from the common port PC to a first port P1 is the opposite; if the slicer is tuned to wavelength $\lambda_1$, then the response from the common port PC to the first port P1 (or vice versa) will not allow signals at wavelength $\lambda_1$ to pass, but will allow all other signals to pass. It is possible to produce spectral slicers 635 and filters 600 tuned at various wavelengths across the spectrum (where complementary slicers 635 and blocking filters 600 are tuned to the same wavelength or wavelength regions), and a number of wavelengths can be used, as shown Wavelength $\lambda_i$ represents any one of several wavelengths—$\lambda_1$, $\lambda_2$, up to the longest wavelength, $\lambda_n$. Connected to each of a plurality of bandwidth transforming nodes 120 are up to n optical taps 130, each with a spectral slicer 635 and an optical filter 600 (when necessary) that are tuned to a unique wavelength slice or region. The responses 1210 shown also apply to wavelength division multiplexers/de-multiplexers 440, 500, 510.

Figures 12B, 12C:
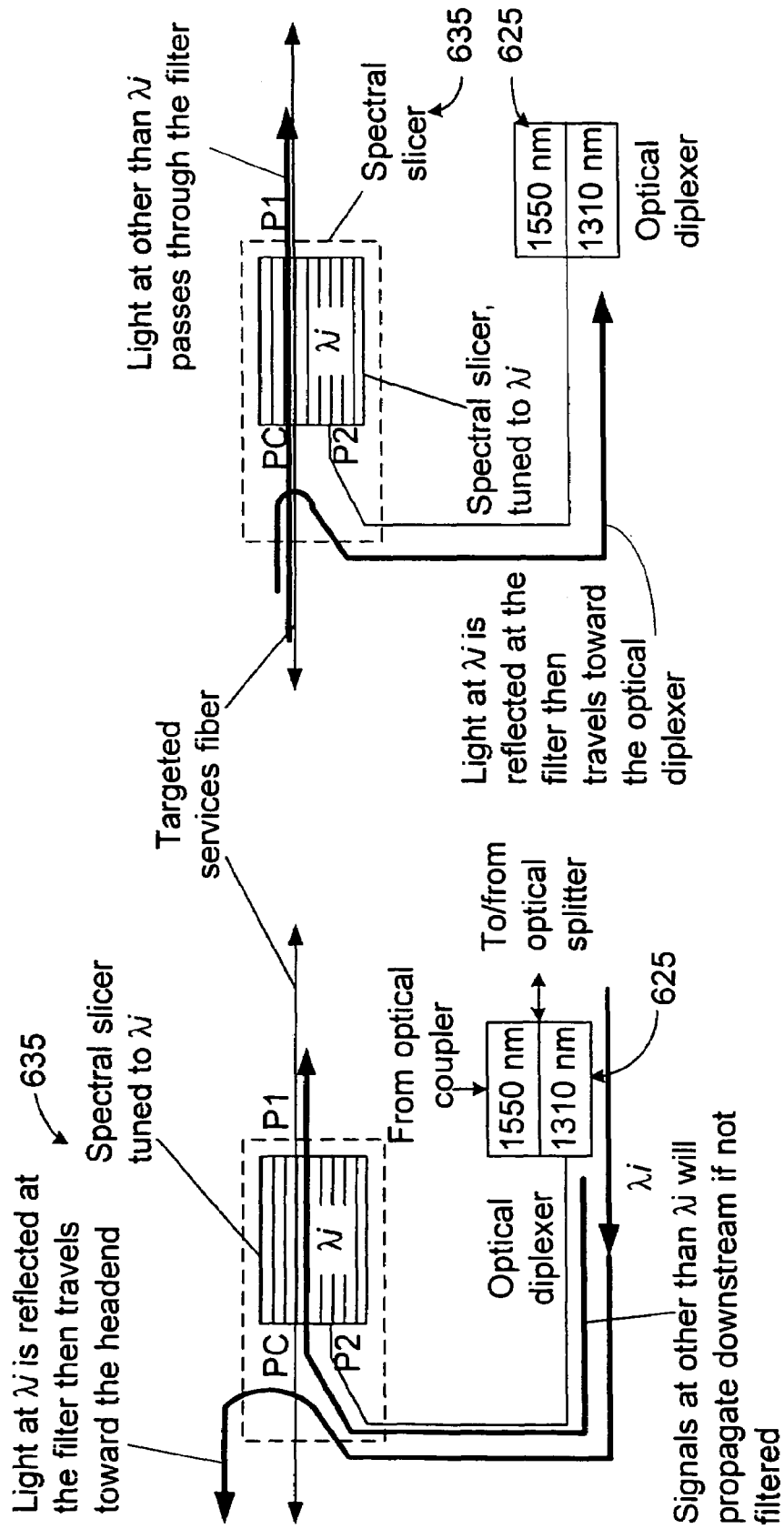

FIG. 12B illustrates how an upstream data signal generated by a transmitter 685 is handled by an optical tap 130. FIG. 12B describes the basic functionality between the spectral slicer 635 of the optical tap 130 and the optical diplexer disposed within the subscriber optical interface 140. FIG. 12B does not illustrate the optical filter 600 disposed between the spectral slicer 635 and the diplexer 625 and the other intermediate components, such as optical splitters 510 and optical diplexers 625 that may present as illustrated in FIG. 6.

The optical transmitter 685 emits optical power at many wavelengths 1205. For a spectral slicer tuned to wavelength $\lambda_i$, upstream signals with a wavelength $\lambda_i$ will be reflected from the second port P2 of the spectral slicer 635 to the common port PC. The reflected signals will then propagate further upstream. In contrast, signals propagating at other wavelengths will pass through second port P2 to the first port P1, and will therefore propagate further downstream (if not otherwise blocked by using a filter 600 not shown in FIG. 12B). Thus, when other wavelengths having optical power could cause interference with other signals further downstream, these unwanted wavelengths can be stopped or removed by using a blocking optical filter 600 (not shown in FIG. 12B but shown in FIG. 6).

FIG. 12C illustrates how a downstream signal is handled by an optical tap 130 when that signal originates from the bandwidth transforming node 120. Similar to FIG. 12B, FIG. 12C focuses on the relationship between the slicer 635 and the diplexer 625 without describing any intermediate structures disposed between these two components as illustrated in FIG. 6. The LED optical transmitter 325 in the bandwidth transforming node 120 emits a narrow band of light, having been filtered by another filter (not shown). The signal at wavelength $\lambda_i$ is reflected from the common port PC of spectral slicer 635 to port P2, to which an optical diplexer 625 is connected. Signals at other wavelengths pass through the spectral slicer 635 from the common port PC to port P1. These signals at other wavelengths are propagated from other transmitters 325 within the bandwidth transforming node 120.

Figure 13:
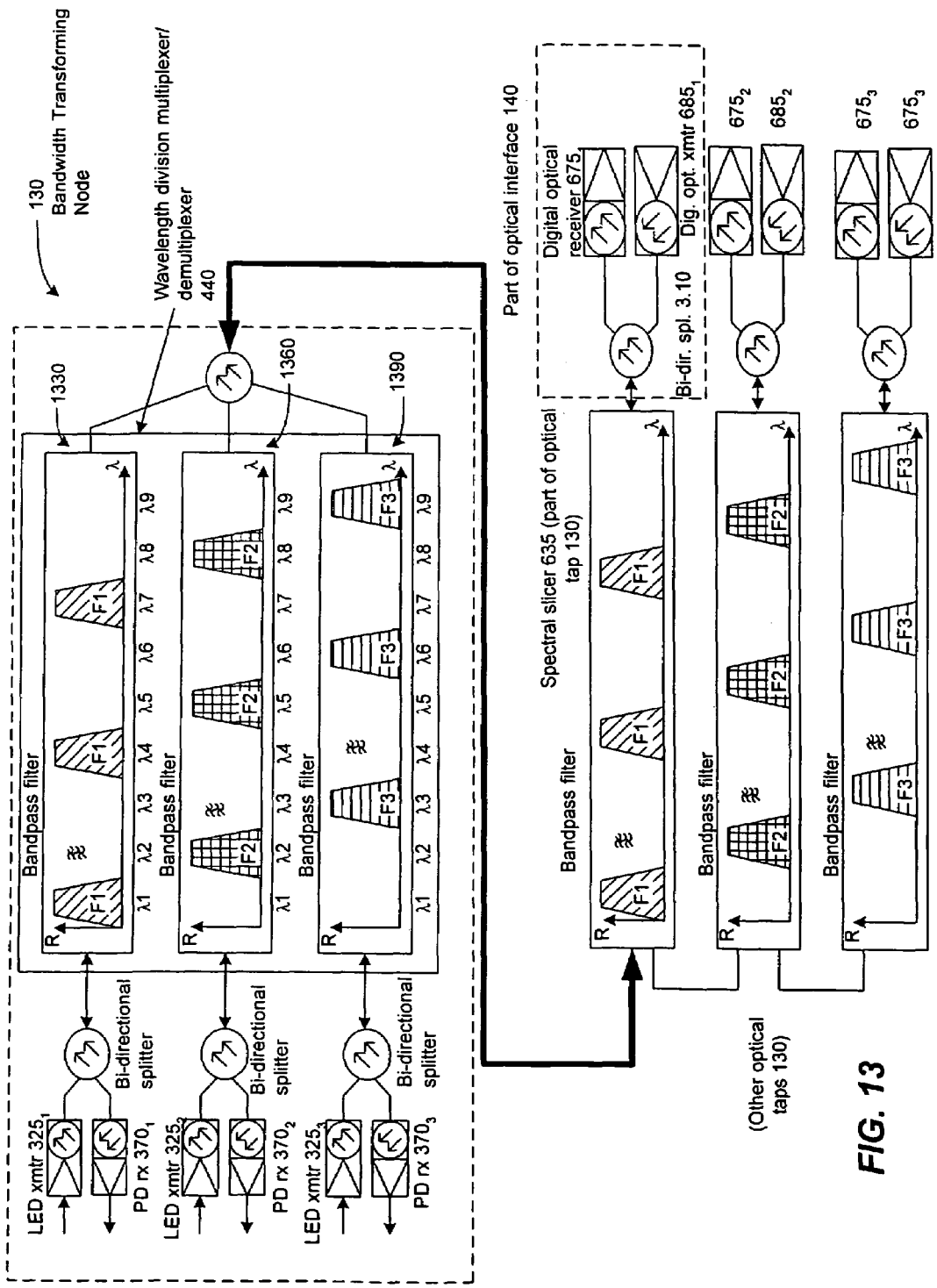
FIG. 13 illustrates the operation of transmitters and receivers disposed within an outdoor bandwidth transforming node and the operation of bandpass filters that may be disposed within spectral slicers forming optical taps of the present invention.

FIG. 13 illustrates the operation of transmitters 325 and receivers 370 disposed within an outdoor bandwidth transforming node 120 and the operation of bandpass filters 600 that may be used with spectral slicers 635 forming the optical taps 130 of the present invention. More specifically, FIG. 13 illustrates the transmitters 325 and receivers 370 in one bandwidth transforming node 120, each supplying optical signals to a wavelength division multiplexer/de-multiplexer 440 having multiple passbands.

A first transmitter 325, and its receiver 370, are connected to a bandpass filter 1330. The bandpass filter 1330 has multiple responses labeled F1, at wavelengths $\lambda_1$, $\lambda_4$, and $\lambda_7$. Similarly, for a second transmitter 325₂ and receiver 370₂, a bandpass filter 1360 has multiple responses labeled F2 at wavelengths $\lambda_2$, $\lambda_5$, and $\lambda_8$. For a third transmitter 325₃ and receiver 370₃, a third bandpass filter 1390 has multiple responses at $\lambda_3$, $\lambda_6$, and $\lambda_9$. In this exemplary embodiment the responses do not overlap with the passbands for the other transmitters 325 and receivers 370.

Spectral slicing is performed in each optical tap 130 using a filter corresponding to the wavelengths to be picked off of (or "sliced," from) that tap. For example, one transmitter 325₁ is intended to send signals to a digital optical receiver 675₁, so the optical tap 130 that serves that optical interface 140 has filters operating at wavelengths corresponding to bandpass filter 1330 disposed in the bandwidth transforming node 120.

Figure 14:
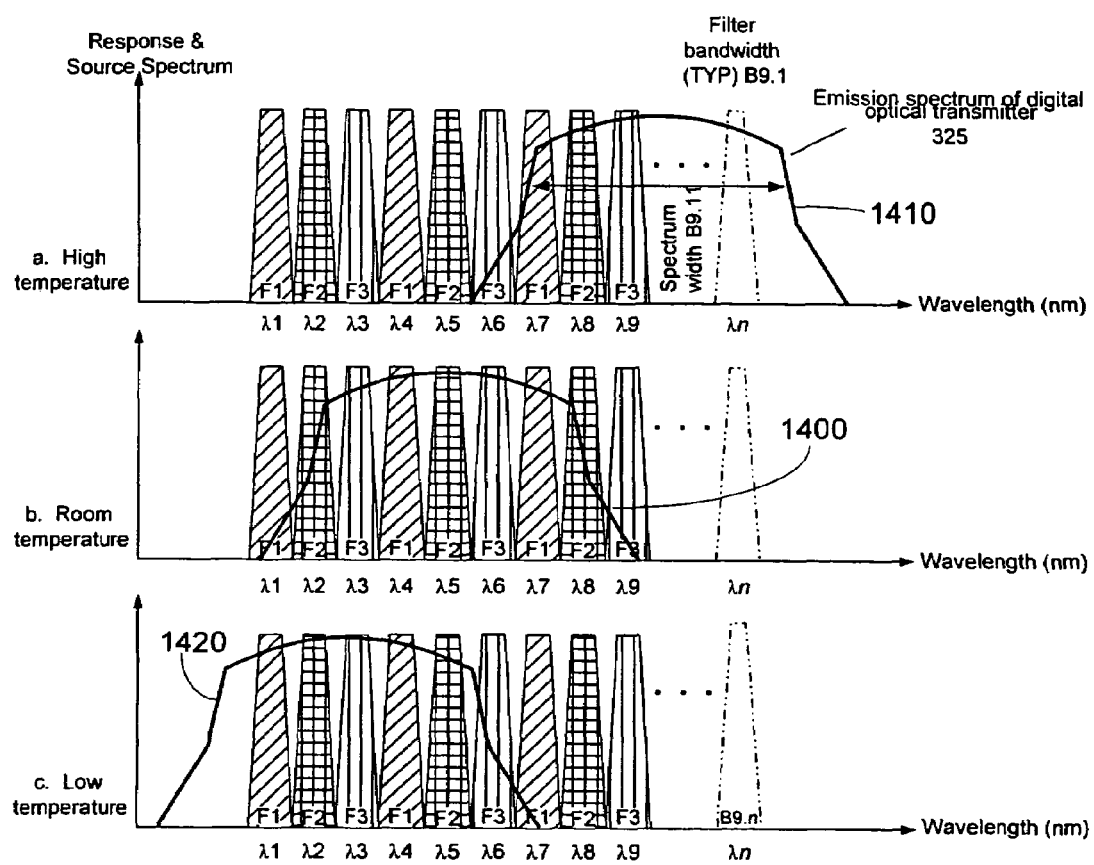
FIG. 14 illustrates the composite pass band of all filters illustrated in FIG. 13.

FIG. 14 illustrates the composite passband of all filters illustrated in FIG. 13. The emission spectrum of the optical transmitters 325₁, 325₂, 325ₙ is also shown. The figure also applies to the digital optical transmitters 685 in the subscriber optical interfaces 140. The emission spectrum at room temperature 1400 is generally centered on the set of passbands shown. For transmitter 325₁, which is to transmit on the wavelengths labeled F1, the passbands at $\lambda_4$ and $\lambda_7$ pass the optical signal. The wavelengths are determined by filters embedded in the wavelength multiplexer/de-multiplexer 440, filters 600, and spectral slicers 635, 930. These passbands 1330, 1360, 1390 are illustrated.

For the emission spectrum at high temperature 1410, the emission spectrum has shifted to higher wavelengths. Now $\lambda_4$ is not a passing signal, but $\lambda_7$ is a passing signal.

The emission spectrum at low temperature 1420 illustrates an exemplary scenario at low temperatures where the emission spectrum has shifted to a lower wavelength. Now $\lambda_1$ and $\lambda_4$ are passing energy, but $\lambda_7$ is not. In this way, at least one passband is available within the emission spectrum of the transmitter at all temperatures. Therefore, another advantage of assigning each subscriber a set of wavelengths becomes apparent: multiple wavelengths corresponding to all subscribers served from one tap compensate for temperature fluctuations of LED digital optical transmitters. In this way, a subscriber can be guaranteed to receive his or her information.

Figure 15:
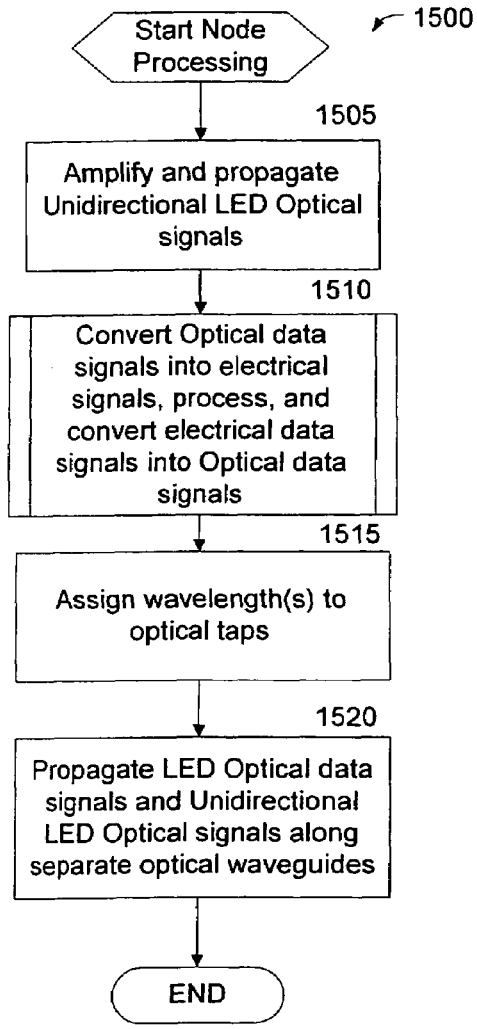
FIG. 15 is a logic flow diagram illustrating an exemplary embodiment of a method for processing unidirectional and bi-directional data signals within a bandwidth transforming node of the present invention.

Referring now to FIG. 15, this figure illustrates an exemplary method for processing unidirectional and bi-directional optical signals with a bandwidth transforming node 120 of the present invention. Basically, FIG. 15 provides an overview of the processing performed by the bandwidth transforming node 120.

Certain steps in the process described below must naturally precede others for the present invention to function as described. However, the present invention is not limited to the order of the steps described if such order or sequence does not alter the functionality of the present invention. That is, it is recognized that some steps may be performed before or after other steps without departing from the scope and spirit of the present invention.

Step 1505 is the first step in the exemplary bandwidth transforming node overview process 1500. In Step 1505, downstream RF modulated optical signals can be amplified by the amplifier 410 as illustrated in FIG. 4. As noted above, amplifiers 330, 410 can comprise Erbium Doped Fiber Amplifiers (EDFAs). However, other optical amplifiers are not beyond the scope of the present invention. The amplified optical signals can then propagate to one or more optical taps 130.

Next, in routine 1510, downstream targeted services digital optical signals can be converted into electrical signals and upstream electrical signals can be converted into optical signals in a fiber transceiver 425. The fiber transceiver 425 can comprise an optical/electrical converter and an electrical/optical converter. Upstream optical signals can propagate between the bandwidth transforming node 120 and the data service hub 110, and the downstream electrical signals can propagate from the fiber transceiver 425 to an optical tap routing device 430. Further details of routine 1510 will be described below with respect to FIGS. 16 and 17.

In step 1515, the wavelength(s) of LED optical data signals can be assigned to groups of subscribers or respective optical taps at the time of installation of the optical taps 130. In other words, each LED optical transmitter 325 can be tuned for a distinct wavelength or wavelength region relative to other LED optical transmitters 325. For downstream signals, the optical tap routing device 430 can manage the interface with the data service hub optical signals and can route these signals to the corresponding individual tap multiplexers 435, which communicate optical signals with particular optical taps 130. Similarly, the optical tap routing device 430 can be notified of available upstream data packets as they arrive from each tap multiplexer 435. Moreover, the optical tap routing device 430 can offer data bandwidth to subscribers in pre-assigned increments. For example, the optical tap routing device 430 can offer a particular subscriber or groups of subscribers bandwidth in units of 1, 2, 5, 10, 20, 50, 100, 200, and 450 Megabits per second (Mb/s). Those skilled in the art will appreciate that other subscriber bandwidth units are not beyond the scope of the present invention. For example, the optical tap routing device could be capable of assigning bandwidths in increments of 250 kb/s. The element management system, which controls the subject equipment and is well known to those skilled in the art, could allow bandwidth to be assigned at 1, 10, and 100 Mb/s if that is what the data service operator wants to sell.

In Step 1520, LED optical data signals and unidirectional LED optical signals can be propagated along separate optical waveguides 150, 170, 180 between the bandwidth transforming node 120 and one or more optical taps 120.

Figure 16:
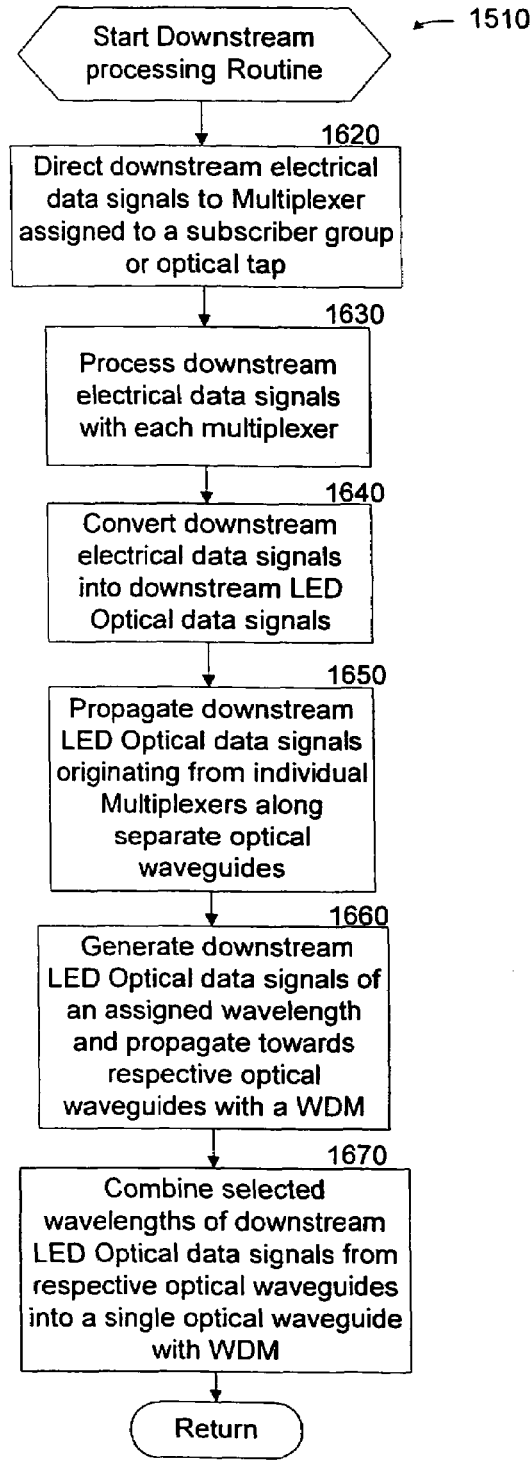
FIG. 16 is a logic flow diagram illustrating an exemplary process for handling downstream data signals within a bandwidth transforming node of the present invention.

Referring now to FIG. 16, this figure illustrates a logic flow diagram of an exemplary routine 1510 for handling downstream optical signals within a bandwidth transforming node 120 according to the present invention. More specifically, the logic flow diagram of FIG. 16 illustrates a first portion of the exemplary routine 1510 for communicating optical signals from a data service provider 110 to at least one subscriber.

As noted above, certain steps in the process described below must naturally proceed others for the present invention to function as described. However, the present invention is not limited to the order of steps described if such order or sequence does not alter the functionality of the present invention. That is, it is recognized that some steps may be performed before or after other steps without departing from the scope and spirit of the present invention.

Step 1620 is the first step in routine 1510 for communicating optical signals from a data service provider 110 to at least one subscriber. In Step 1620, the optical tap routing device 430 can direct downstream electrical data signals to a multiplexer 435 assigned to a subscriber group or optical tap 130. As described above, the optical tap routing device 430 can manage the interface with the data service hub optical signals and can route these signals to the corresponding individual tap multiplexers 435 that communicate optical signals with particular optical taps 130. Next in Step 1620, the downstream electrical data signals can be processed within each multiplexer 435. The tap multiplexers 435 can propagate optical signals to the various groupings of subscribers.

The one or more tap multiplexers 435 can propagate downstream electrical signals to one or more LED optical transmitters 325. The LED optical transmitters 325 can produce the downstream optical signals that propagate towards the subscriber optical interfaces 140. In Step 1640, the downstream electrical data signals are converted into downstream LED optical data signals by the LED optical transmitters 325. These signals propagate between the LED optical transmitters 325 and a bi-directional splitter 360.

Next in Step 1650, the bi-directional splitter 360 can propagate downstream LED optical data signals originating from individual multiplexers 435 along separate optical waveguides to one or more wavelength division multiplexers 440, 500, 510. Next in Step 1670, once the downstream signals propagate from the bi-directional splitter 360 to the wavelength division multiplexer 440, 500 the wavelength division multiplexer 440, 500 can combine or multiplex the wavelengths of light that propagate from each LED optical transmitter 325. It is here that wavelengths are selected by the internal filter structure illustrated in 1330, 1360, and 1390.

FIG. 17 illustrates a logic flow diagram illustrating the handling of upstream data signals within an exemplary bandwidth transforming node 120 of the present invention. More specifically, FIG. 17 illustrates a second portion of routine 1510 for communicating optical signals from at least one subscriber to a data service provider hub 110.

As noted above, certain steps in the process described below must naturally proceed others for the present invention to function as described. However, the present invention is not limited to the order of the steps described if such order or sequence does not alter the functionality of the present invention. That is, it is recognized that some steps may be performed before or after other steps without departing from the scope and spirit of the present invention.

Step 1710 is the first step in the exemplary bandwidth transforming node upstream routine 1510. In Step 1710, multiplexed upstream LED optical data signals from optical taps 130 are disassembled into separate LED optical data signals of assigned wavelengths by one or more wavelength division de-multiplexers 440, 510. Each wavelength division de-multiplexer 440, 510 can select a different wavelength or wavelengths of light that propagate from a respective optical tap 130.

In Step 1720 LED optical data signals of assigned wavelengths are fed into separate optical waveguides by the wavelength division de-multiplexer 440, 510.

In Step 1730, upstream LED optical data signals can be converted by an optical receiver 370 into electrical signals. Each optical receiver 370 can comprise one or more photoreceptors or photodiodes that convert optical signals into the electrical domain.

In Step 1740, upstream electrical data signals can be processed with respective subscriber assigned multiplexers 435. The multiplexers 435 can notify the optical tap routing device 430 of available upstream data packets as they arrive.

In Step 1750, processed upstream electrical data signals can be combined in the optical tap routing device 430. In Step 1760, upstream electrical data signals can be converted to upstream optical data signals by the fiber transceiver 425. Next, in Step 1770, the optical data signals can be fed into an optical waveguide 160 by the fiber transceiver 425.

FIG. 18 is a logic flow diagram illustrating the processing of unidirectional and bi-directional data signals with an optical tap 130 according to the present invention. As noted above, certain steps in the process described below must naturally proceed others for the present invention to function as described. However, the present invention is not limited to the order of steps described if such order or sequence does not alter the functionality of the present invention. That is, it is recognized that some steps may be performed before or after other steps without departing from the scope and spirit of the present invention.

Step 1810 is the first step in the optical tap process 1800. In Step 1810, an optical coupler 620 channels or taps unidirectional optical signals from an optical waveguide 150 that propagate from a bandwidth transforming node 120 or another optical tap 130. The optical coupler 620 can extract signal power from the broadcast waveguide 150 and route the extracted signal to an optical diplexer 625 or to another optical tap 130.

Next, in Steps 1820, 1830, a spectral slicer 635 extracts or reflects optical signals that propagate from the bandwidth transforming node 120 or another optical tap 130 to the optical tap 130 via a targeted services waveguide 170. In Step 1830, the spectral slicers 635 can extract a set of subscriber assigned wavelengths from the LED optical data signals. In Step 1840, the optical tap 130 propagates the assigned wavelength(s) of LED optical data signals and unidirectional signals to respective subscribers via a subscriber optical interface 140.

Figure 19:
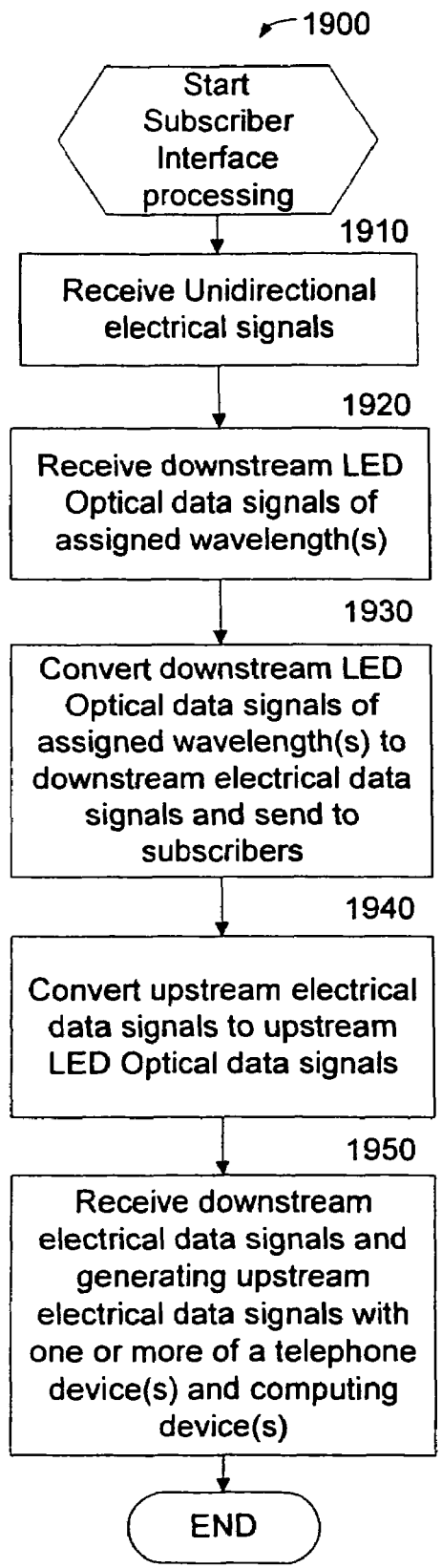
FIG. 19 is a logic flow diagram illustrating the processing of unidirectional and bi-directional data signals within a subscriber interface of the present invention.

FIG. 19 is a logic flow diagram illustrating exemplary processing of unidirectional and bi-directional data signals with a subscriber optical interface 140 according to the present invention. As noted above, certain steps in the process described below must naturally proceed others for the present invention to function as described. However, the present invention is not limited to the order of steps described if such order or sequence does not alter the functionality of the present invention. That is, it is recognized that some steps may be performed before or after other steps without departing from the scope and spirit of the present invention.

Step 1910 is the first step in the subscriber optical interface process 1900. In Step 1910, unidirectional electrical signals are received by the optical subscriber interface 140 by an analog optical receiver 660. However, if the analog optical receiver 660 is located in the optical tap 130, this step can be performed earlier in Step 1800. The analog optical receiver 660 converts the electrical signals and sends them to one or more subscribers. Next, in Step 1920, downstream LED optical data signals of assigned wavelength(s) can be received by the subscriber optical interface 140. In Step 1930, downstream LED optical data signals of assigned wavelength(s) can be converted to downstream electrical data signals by a digital optical receiver 675 in the subscriber optical interface 140. In Step 1940, upstream electrical data signals can be converted to upstream LED optical data signals in the subscriber optical interface 140 by a digital optical transmitter 685. In Step 1950, downstream electrical data signals can be received and upstream electrical data signals can be generated with one or more of a telephone device 690 and computing device 695 by a processor 680.

Those skilled in the art will appreciate that the optical network architecture 100 of the present invention can provide at least one of video, telephone, and computer communication services via the optical signals. Also, those skilled in the art will appreciate that the video layer comprising the RF modulated signals can be removed from the exemplary optical network architecture 100 without departing from the scope and spirit of the present invention.

With the present invention, an all fiber optical network and method that can propagate the same bit rate downstream and upstream to/from a network subscriber are provided. Further, the present invention provides an optical network system and method that can service a large number of subscribers while reducing the number of connections at the data service hub.

The present invention also provides an active signal source that can be disposed between a data service hub and a subscriber and that can be designed to withstand outdoor environmental conditions. The present invention can also be designed to hang on a strand or fit in a pedestal similar to conventional cable TV equipment that is placed within a last mile of a communications network. The system and method of the present invention can receive at least one Gigabit or faster Ethernet communications in optical form from a data service hub and partition or apportion this optical bandwidth into distribution groups of a predetermined number.

The system and method of the present invention can allocate additional or reduced bandwidth based upon the demand of one or more subscribers on an optical network. Additionally, the optical network system of the present invention lends itself to efficient upgrading that can be performed entirely on the network side. In other words, the optical network system allows upgrades to hardware to take place in locations between and within a data service hub and an active signal source disposed between the data service hub and a subscriber.

And lastly, by using multiple sets of wavelengths for each subscriber grouping or optical tap 130, the present invention enables simultaneous transmissions of upstream optical signals from a plurality of subscriber groupings or optical taps 140 that are coupled to the same optical waveguide, unlike the conventional art. In this way, not only are transmission speeds substantially increased, but bandwidth is substantially increased. Further, by assigning each subscriber a separate and distinct wavelength or wavelength region relative to other subscribers, carrier sense or the staggering of upstream or downstream transmissions between respective subscriber optical interfaces coupled to the same optical tap 130 can be substantially reduced or eliminated.

It should be understood that the foregoing relates only to illustrate the embodiments of the present invention, and that numerous changes may be made therein without departing from the scope and spirit of the invention as defined by the following claims.

What is claimed is:

1. An optical network system comprising
a data service hub;
at least one optical tap, the optical tap further comprising a spectral slicer for passively extracting optical wavelengths of downstream optical signals and for passively combining optical wavelengths of upstream optical signals;
at least one subscriber optical interface connected to the optical tap for receiving the extracted wavelengths of downstream optical signals and for sending upstream optical signals;
a bandwidth transforming node disposed between the data service hub and the optical tap, the bandwidth transforming node being coupled to the data service hub and being coupled to the at least one subscriber optical interface, for propagating upstream signals to the data service hub and propagating downstream optical signals to the subscriber optical interface, the bandwidth transforming node receiving downstream signals from the data service hub and upstream optical signals from the subscriber optical interface, the bandwidth transforming node comprising a routing device for apportioning bandwidth in an electrical domain between subscribers without the routing device performing any optical wavelength availability analysis and the routing device using a look-up table for processing both upstream and downstream electrical signals without any formatting and reformatting of data into two or more different formats performed by digital signal processors and interpolators, the bandwidth transforming node converting downstream electrical signals exiting from the routing device into a plurality of wavelengths in an optical domain for transmission from the routing device along a single optical waveguide to the subscriber optical interface through the optical tap.

2. The optical network system of claim 1, further comprising a plurality of subscribers and wherein each subscriber is assigned similar wavelength.

3. The optical network system of claim 1, wherein the slicer reflects upstream optical signals received from one or more subscribers.

4. The optical network system of claim 3, wherein the slicer comprises an optical filter that reflects a tuned wavelength region while passing wavelengths outside the tuned wavelength region.

5. The optical network system of claim 4, further comprising a plurality of subscriber optical interfaces, wherein the subscriber optical interfaces can simultaneously transmit upstream optical signals.

6. The optical network system of claim 5, wherein the bandwidth transforming node further comprises at least one wavelength division multiplexer.

7. The optical network system of claim 6, wherein the bandwidth transforming node further comprises at least one wavelength division de-multiplexer.

8. The optical network system of claim 3, wherein the bandwidth transforming node further comprises:
at least one multiplexer coupled to an optical tap routing device;
at least one optical transmitter connected to the at least one multiplexer, for transmitting downstream optical signals received from the data service hub to at least one subscriber optical interface of the optical network system; and
at least one optical receiver connected to each multiplexer, for receiving and converting upstream optical signals from at least one subscriber optical interface of the optical network system.

9. The optical network system of claim 8, wherein the bandwidth transforming node accepts gigabit Ethernet optical signals from the data service hub and partitions the Ethernet optical signals into a predetermined number of groups.

10. The optical network system of claim 8, wherein the bandwidth transforming node is mountable on a strand in an overhead plant environment.

11. The optical network system of claim 8, wherein the bandwidth transforming node is housed within a pedestal in an underground plant environment.

12. The optical network system of claim 8, wherein the routing device allocates additional or reduced optical bandwidth to at least one subscriber optical interface relative to other subscriber optical interfaces in the optical network system.

13. The optical network system of claim 12, wherein the routing device manages upstream and downstream optical signal protocols.

14. The optical network system of claim 13, wherein data bit rates for the upstream and downstream optical signals are substantially symmetrical.

15. The optical network system of claim 14, wherein one of the optical taps servicing a particular group of subscriber optical interfaces is connected to another optical tap.

16. A method for communicating optical signals from at least one subscriber to a data service provider comprising the steps of:
passively transmitting upstream optical signals with a slicer from an optical tap, the optical tap selecting a first set of wavelengths;
receiving the upstream optical signals from a single optical waveguide at a bandwidth transforming node from the optical tap;
converting the upstream optical signals to electrical signals at the bandwidth transforming node;
combining upstream electrical signals in the bandwidth transforming node;
apportioning bandwidth with a routing device in an electrical domain for the first and second subscriber in the bandwidth transforming node;
using a look-up table with the routing device for processing the upstream electrical signals without any formatting and reformatting of data into two or more different formats performed by digital signal processors and interpolators, and without the routing device performing any optical wavelength availability analysis; and
propagating the combined upstream electrical signals to the data service provider.

17. The method of claim 16, further comprising the step of combining respective upstream optical signals originating from a plurality of subscriber optical interfaces with at least one optical tap.

18. The method of claim 16, further comprising the step of maintaining substantially symmetrical data bit rates between the downstream optical signals and the upstream optical signals.

19. A method for communicating optical signals from a data service provider to at least one subscriber comprising the steps of:
dividing the downstream electrical signals with a routing device between preassigned multiplexers in the bandwidth transforming node, the preassigned multiplexers corresponding to a grouping of subscribers;
multiplexing the downstream electrical signals at the preassigned multiplexers;
assigning wavelength for a single optical tap;
apportioning bandwidth with the routing device in the electrical domain between subscribers in the bandwidth transforming node;
using a look-up table with the routing device for processing the downstream electrical signals without any formatting and reformatting of data into two or more different formats performed by digital signal processors and interpolators, and without the routing device performing any optical wavelength availability analysis;
converting the downstream electrical signals to optical signals in a wavelength region assigned for each respective optical tap; and
propagating respective combined downstream optical signals to at least one subscriber along at least one optical waveguide.

20. The method of claim 19, further comprising the step of providing one of video, telephone, and internet services via the optical signals.

21. The method of claim 19, further comprising the steps of:
extracting selected wavelengths from the downstream optical signals with at least one optical tap; and
propagating the sliced downstream optical signals to at least one subscriber along at least one optical waveguide.

22. The method of claim 19, further comprising the step of feeding a first optical tap with optical signals from a second optical tap.

23. The method of claim 19, wherein the step of apportioning bandwidth further comprises the step of allocating additional or reduced optical bandwidth for at least one particular subscriber relative to other subscribers in the optical network system.

24. The method of claim 19, further comprising the steps of:
compensating for shifts in an optical transmitter output due to temperature fluctuations by generating sets of wavelengths with the optical transmitter; and
assigning each set of wavelengths to a particular optical tap.

* * * * *